United States Patent
Iwata et al.

(10) Patent No.: US 6,812,592 B2
(45) Date of Patent: Nov. 2, 2004

(54) VOLTAGE FLUCTUATION COMPENSATING APPARATUS

(75) Inventors: Akihiko Iwata, Tokyo (JP); Akihiro Suzuki, Tokyo (JP); Hiroyuki Sasao, Tokyo (JP); Kenichi Koyama, Tokyo (JP); Toshiyuki Kikunaga, Tokyo (JP); Mitsugu Takahashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 431 days.

(21) Appl. No.: 10/109,045

(22) Filed: Mar. 29, 2002

(65) Prior Publication Data

US 2002/0140294 A1 Oct. 3, 2002

(30) Foreign Application Priority Data

Mar. 30, 2001 (JP) ..................... P. 2001-098548

(51) Int. Cl.⁷ .............. H02J 3/12; G05F 1/70
(52) U.S. Cl. ..................... 307/103; 323/207
(58) Field of Search ................ 307/103, 105; 323/205, 207

(56) References Cited

U.S. PATENT DOCUMENTS

| | | | | |
|---|---|---|---|---|
| 4,673,823 A | * | 6/1987 | Tanaka | 307/11 |
| 4,752,726 A | * | 6/1988 | Aoyama | 323/207 |
| 4,812,669 A | * | 3/1989 | Takeda et al. | 307/105 |
| 5,825,162 A | * | 10/1998 | Kida et al. | 323/210 |

FOREIGN PATENT DOCUMENTS

| | | |
|---|---|---|
| JP | 3-228924 | 9/1988 |
| JP | 1-170328 | 7/1989 |

* cited by examiner

*Primary Examiner*—Adolf Berhane
(74) *Attorney, Agent, or Firm*—Leydig, Voit & Mayer, Ltd.

(57) ABSTRACT

Voltage compensating circuits are connected serially to a power system, including capacitors each having different charging voltages (in relationship of approximately $2^k$ (K=0, 1, 2, ...) times the smallest charging voltage value). The voltage compensating circuits convert DC voltages in the capacitors into AC voltages and output the AC voltages, respectively. The voltages of the capacitors are detected as detected values V1 to V3. The detected values V1 to V3 are used as bit signals for a reference value to check a voltage dip amount of the power system with the reference value and to convert the voltage dip amount into a binary signal. A combination is selected from the voltage compensating circuits in accordance with the binary signal so that the sum of output voltages of the selected voltage compensating circuits compensates the voltage dip of the power system.

13 Claims, 18 Drawing Sheets

FIG.16

| D1 | D2 | D3 | D0 | OUTPUT |
|----|----|----|----|--------|
|    |    |    | -1 | -7     |
| 1  |    |    | -1 | -6     |
|    | 1  |    | -1 | -5     |
| 1  | 1  |    | -1 | -4     |
|    |    | 1  | -1 | -3     |
| 1  |    | 1  | -1 | -2     |
|    | 1  | 1  | -1 | -1     |
| 1  | 1  | 1  | -1 | 0      |
| 0  | 0  | 0  | 0  | 0      |
| 1  |    |    | 0  | 1      |
|    | 1  |    | 0  | 2      |
| 1  | 1  |    | 0  | 3      |
|    |    | 1  | 0  | 4      |
| 1  |    | 1  | 0  | 5      |
|    | 1  | 1  | 0  | 6      |
| 1  | 1  | 1  | 0  | 7      |

VOLTAGE FLUCTUATION COMPENSATING APPARATUS

BACKGROUND OF THE INVENTION

1. Field of the Invention

The present invention relates to a voltage fluctuation compensating apparatus for detecting and compensating a voltage dip when voltage of an electric power system supplied to a load dips instantaneously.

2. Description of the Related Art

In some cases, voltage of an electric power system may dip instantaneously due to lightning so that a precision machine in a factory malfunctions or stops temporarily to cause great damage in a production line. In order to prevent such damage, there is used a voltage fluctuation compensating apparatus for monitoring voltage fluctuation such as an instantaneous voltage dip in an electric power system, and compensating the voltage dip.

FIG. 18 is a schematic configuration diagram showing a related-art voltage fluctuation compensating apparatus. As shown in FIG. 18, electric power from a power line 1 is stepped down by a transformer 2, and then connected to a customer 3 (load) through a voltage fluctuation compensating apparatus. Thus, electric power is supplied to the customer 3. The voltage fluctuation compensating apparatus includes a DC power source 4, an inverter 5, a smoothing filter 6, and a high-capacity transformer 7.

Description will be made below about the voltage compensating operation in such a related-art voltage fluctuation compensating apparatus at the time of an instantaneous dip of a system voltage.

FIG. 19 shows a system voltage, an output of a voltage fluctuation compensating circuit, and a voltage supplied to the customer 3, respectively, at the time of an instantaneous dip of a system voltage. As shown in FIG. 19, when a voltage dip occurs instantaneously in the system voltage, the voltage dip is detected by a detection unit (not shown) which monitors voltage fluctuation. By the power feeding control based on the detected voltage dip, an AC voltage is generated by the DC power source 4 and the inverter 5 in the voltage fluctuation compensating apparatus. The AC voltage is connected in series to the power system through the smoothing filter 6 and the high-capacity transformer 7. Thus, the voltage dip of the power system is compensated. As a result, the output voltage from the voltage fluctuation compensating apparatus is added to the system voltage in which the voltage dip has occurred, so that electric power with a normal voltage is supplied to the customer 3.

Since the related-art voltage fluctuation compensating apparatus is configured thus, the system voltage flows into the inverter 5 through the transformer 7 correspondingly to a load current even when the system voltage is normal. As a result, loss by the transformer 7 and the inverter 5 occurs even at the normal time. Thus, a large-scale cooling unit is required.

In addition, since a voltage is supplied to the power system through the smoothing filter 6 and the transformer 7 at the time of an instantaneous dip of the system voltage, the capacities of the smoothing filter 6 and the transformer 7 becomes high. Thus, there has been a problem that the apparatus increases in size.

SUMMARY OF THE INVENTION

The invention has been made to solve the foregoing problems. An object of the invention is to obtain a voltage fluctuation compensating apparatus which can carry out voltage compensation with high accuracy at the time of an instantaneous dip of the system voltage, and which can be arranged as a whole at low cost and in a small size.

According to the invention, there is provided a voltage fluctuation compensating apparatus for suppressing fluctuation of a voltage supplied to a load. The voltage fluctuation compensation apparatus includes a detection/control portion, and a plurality of voltage compensating circuits.

The detection/control portion monitors a voltage dip in a power system, and controls power feeding in accordance with a result of the voltage dip monitoring.

The voltage compensating circuits is connected in series to the power system. The voltage compensating circuits includes a plurality of energy storage units (capacitors) respectively having charging voltage values different from one another and in relationship of approximately $2^k$-fold (K=0, 1, 2, . . . ) with respect to a smallest charging voltage value (absolute value) of the charging voltages. The voltage compensating circuits convert DC voltages charged in the capacitors into AC voltages and outputs the AC voltages, respectively.

The charging voltage values of the capacitors respectively in the voltage compensating circuits are used as bit signals for a reference value to check a voltage dip amount of the power system with the reference value and A/D convert the voltage dip amount into a binary signal. The desired combination is selected from the plurality of voltage compensating circuits in accordance with the binary signal so that a total sum of output voltages of the selected voltage compensating circuits compensates for the voltage dip of the power system.

BRIEF DESCRIPTION OF DRAWINGS

FIG. 16 is a table showing A/D converted binary signals according to the eighth embodiment of the invention.

DETAILED DESCRIPTION OF THE PRESENT INVENITON

The present invention will be described with reference to the accompanying drawings.

First Embodiment

A first embodiment of the invention will be described below in detail.

Figure 1:
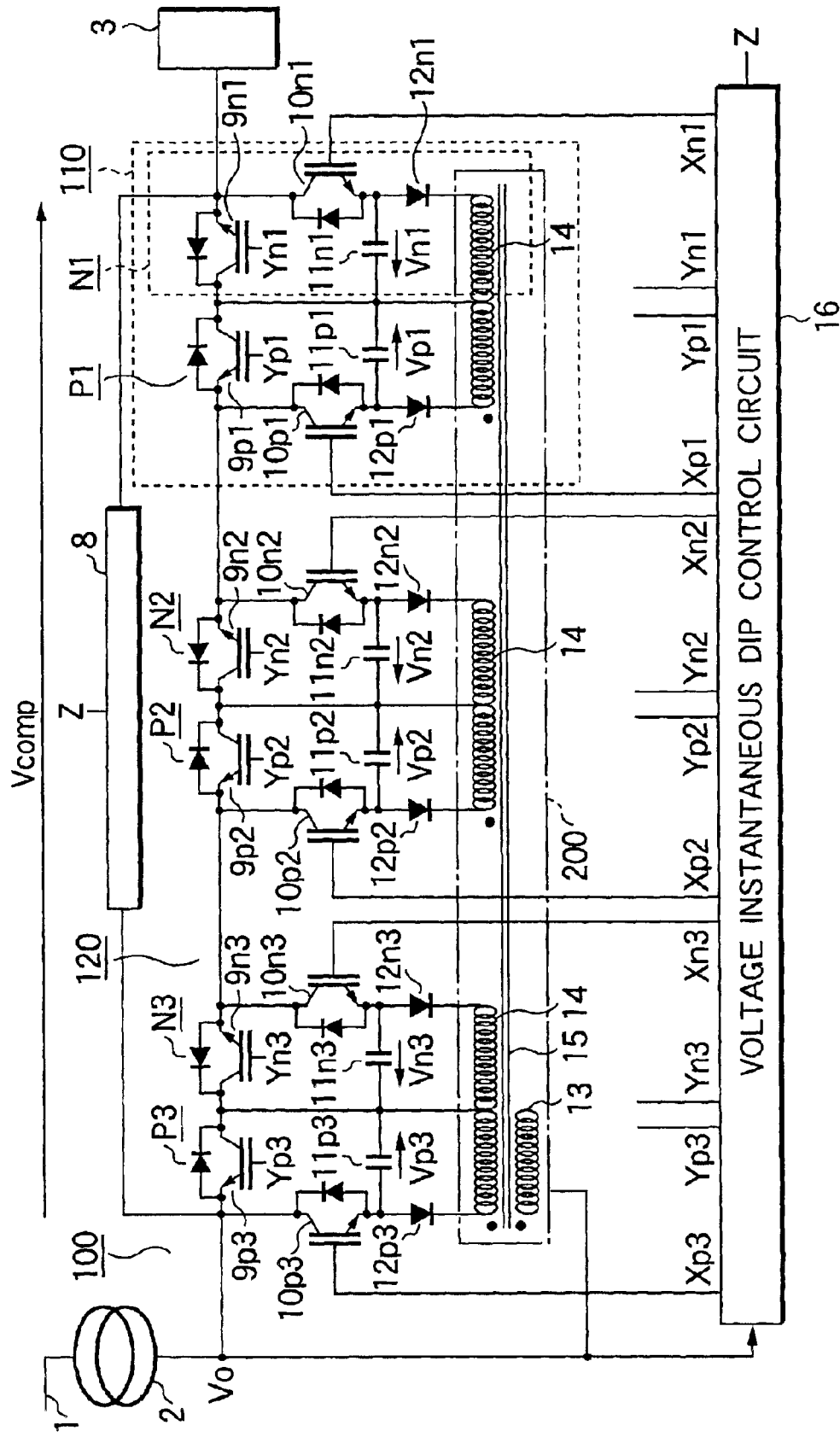
FIG. 1 is a configuration diagram of a voltage fluctuation compensating apparatus according to a first embodiment of the invention.

FIG. 1 is a configuration diagram of a voltage fluctuation compensating apparatus according to the first embodiment of the invention.

Electric power from a power line 1 is stepped down by a transformer 2, and connected to a customer 3 (load) through a voltage fluctuation compensating apparatus 100. Thus, the electric power is supplied to the customer 3.

In the voltage fluctuation compensating apparatus 100, as shown in FIG. 1, a plurality of compensating units 110 each constituted by two voltage compensating circuits P and N selected in accordance with the polarity of the voltage are connected in series to the power system. A total compensating circuit 120 constituted by the plurality (six in this case) of voltage compensating circuits N1, P1, N2, P2, N3 and P3 connected in series has a high-speed mechanical steady-state short-circuit switch 8 in its output terminal in parallel with the total compensating circuit 120.

Each of the voltage compensating circuits P1 to P3 and N1 to N3 has an instantaneous dip change-over switch 9 provided in parallel with an output terminal of the voltage compensating circuit, an instantaneous dip compensating switch 10, a charging capacitor 11 as an energy storage unit, and a charging diode 12 and a secondary winding 14 of a charging transformer 200 for charging the charging capacitor 11. The charging voltage of the charging capacitor 11 is connected to the power system through the instantaneous dip compensating switch 10 connected in series with the charging capacitor 11. In addition, each of the instantaneous dip change-over switch 9 and the instantaneous dip compensating switch 10 is constituted by a semiconductor switching device, for example, an IGBT, to which a diode is connected in anti-parallel. Incidentally, the semiconductor switching device maybe a self arc-extinguishing device other than the ICGBT.

The charging capacitor 11 is charged with a voltage by the charging diode 12 and the secondary winding 14 of the charging transformer 200. A primary winding 13 of the charging transformer 200 is connected to the power system. Further, in FIG. 1, the charging transformer 200 is provided with a core 15.

The two voltage compensating circuits P and N in each compensating unit 110 takes charge of generation of positive and negative voltages respectively. That is, by the action of two charging diodes 12p and 12n, a charging capacitor 11p and a charging capacitor 11n are respectively charged with voltages with polarities reverse to each other but with the same magnitude by use of the common secondary winding 14.

The ratio among voltages charged into the charging capacitors ((11p1, 11n1), (11p2, 11n2) and (11p3, 11n3)) in the respective compensating units 110 is set to be approximately a ratio of a power of 2. That is, the following relationship is satisfied.

$Vn3 = 2 \times Vn2 = 2 \times 2 \times Vn1$ (The same relationship is applied to p)

The steady-state short-circuit switch 8, the instantaneous dip change-over switches 9 and the instantaneous dip compensating switches 10 are connected to a voltage instantaneous dip control circuit 16 as a detection/control portion. In addition, the system voltage is also supplied to the voltage instantaneous dip control circuit 16. Description will be made below about the configuration and operation of this voltage instantaneous dip control circuit 16.

Figure 2:
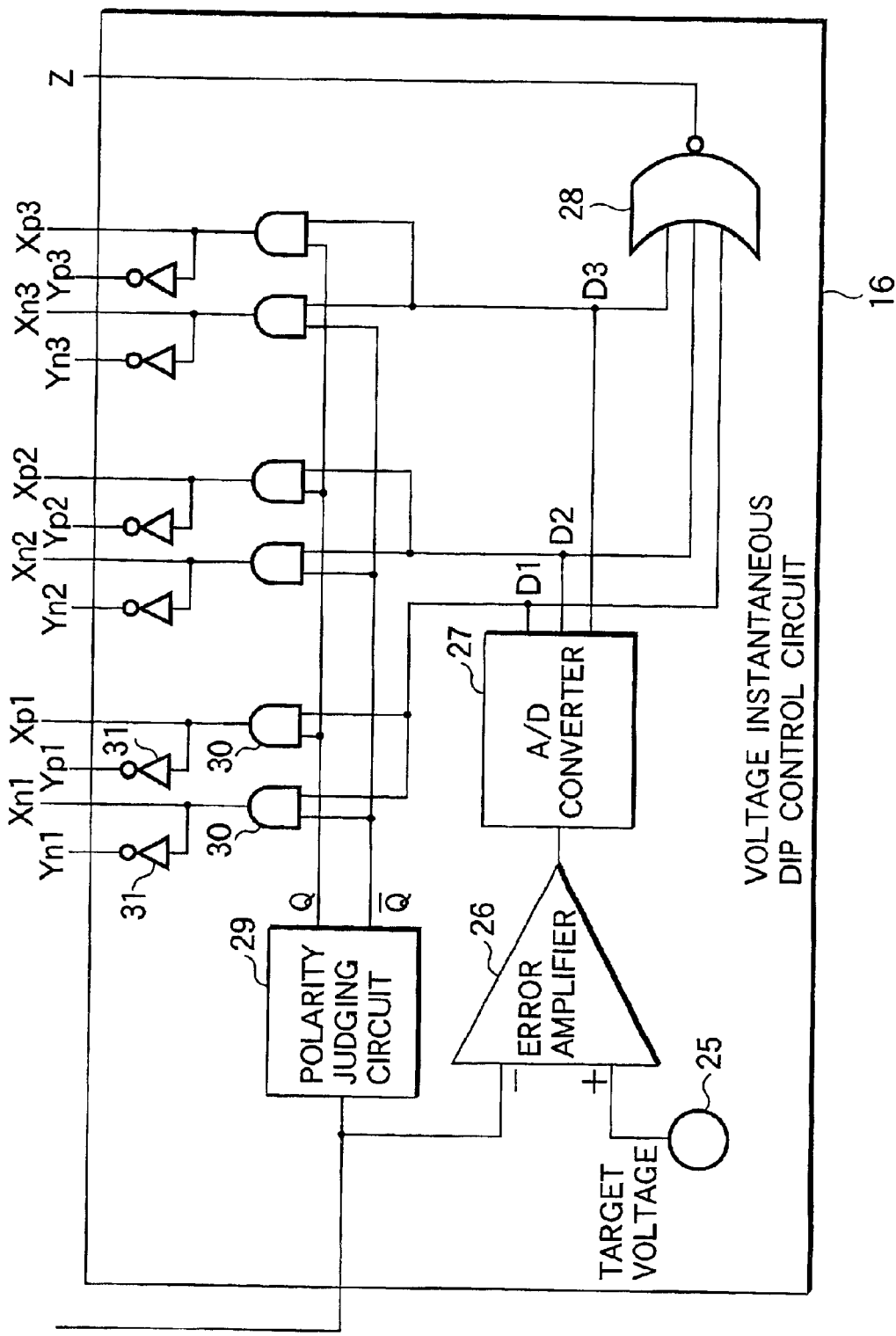
FIG. 2 is a circuit diagram showing the details of a voltage instantaneous dip control circuit according to the first embodiment of the invention.
Figure 3:
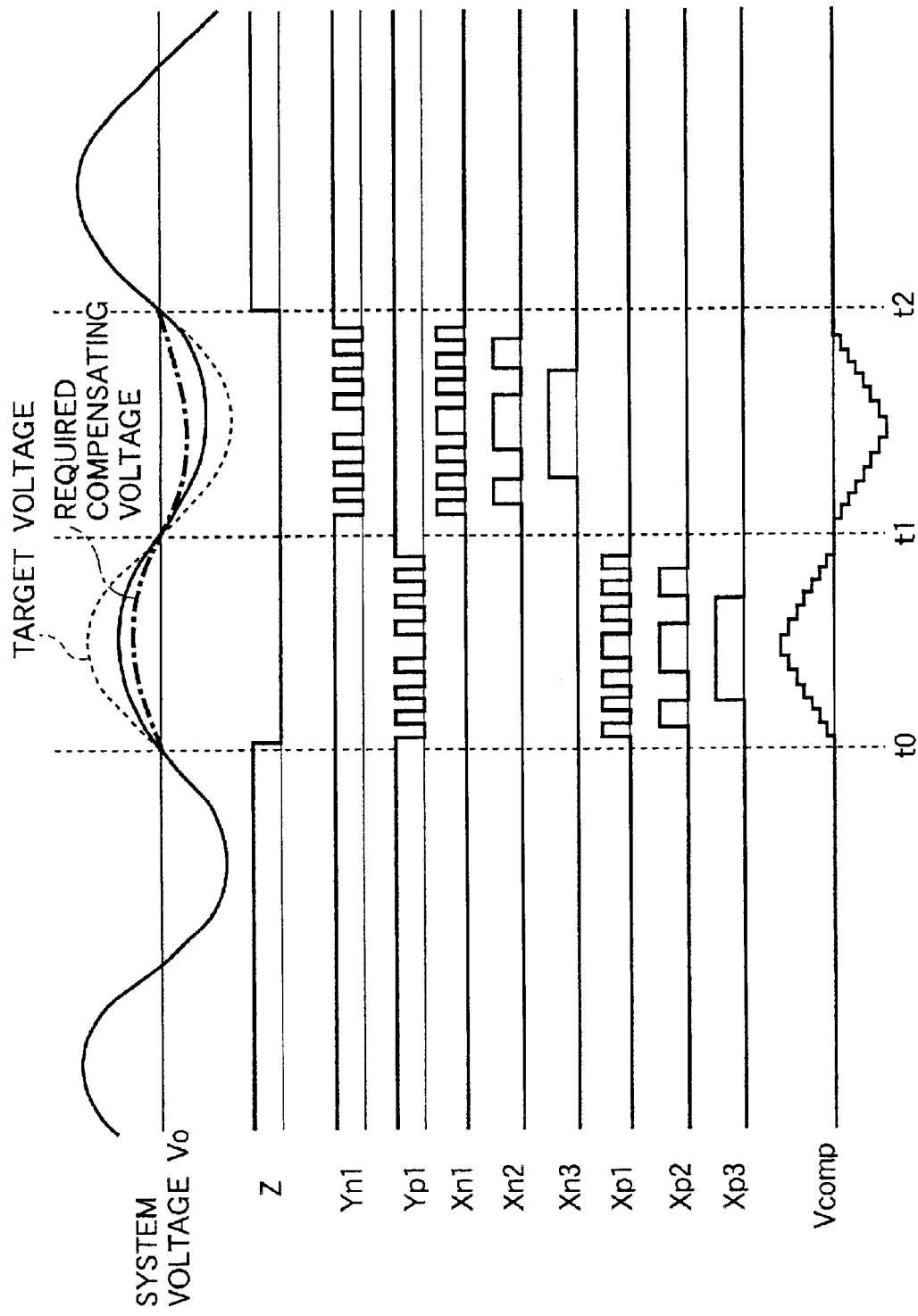
FIG. 3 is a waveform diagram for explaining the operation of the voltage fluctuation compensating apparatus according to the first embodiment of the invention.

FIG. 2 is a circuit diagram showing the details of the voltage instantaneous dip control circuit 16. In addition, FIG. 3 is a waveform diagram showing the relationship between the operation of voltage compensation by the voltage fluctuation compensating apparatus 100 shown in FIG. 1 and the control operation of the voltage instantaneous dip control circuit 16.

As shown in FIG. 2, the system voltage is supplied to the voltage instantaneous dip control circuit 16, and compared with a target voltage 25. At this time, the target voltage 25 is selected to be equal to the system voltage at the normal time. The difference between the system voltage and the target voltage 25 is amplified by an error amplifier 26, subjected to absolute value transformation, and then converted into a 3-bit digital signal (D1 to D3) by an A/D converter 27. The gain of the error amplifier 26 is adjusted in advance so that only the least significant bit of the output signal from the A/D converter 27 takes 1, that is, the output signal takes "001" when the difference between the system voltage and the target voltage 25 becomes equal to the charging voltage Vp1 of the charging capacitor 11p1.

When any one of the bit signals D1 to D3 takes 1, the steady-state short-circuit switch 8 is turned off by a signal Z (=0) through an NOR circuit 28.

On the other hand, the system voltage supplied to the voltage instantaneous dip control circuit 16 is also supplied to a polarity judging circuit 29 so that the polarity thereof is judged. Next, signals Yp or Yn and Xp or Xn activated by the bit signals D1 to D3 of the digital signal are selected through AND circuits 30 and inverters 31 in accordance with the positive or negative polarity of the system voltage. The signal Xp, Xn is a driving signal for the instantaneous dip compensating switch 10, and the signal Yp, Yn is a driving signal for the instantaneous dip change-over switch 9. The instantaneous dip change-over switch 9 and the instantaneous dip compensating switch 10 are designed to always operate in polarities reverse to each other by an inverter 31.

When the system voltage is normal, that is, when all the bit signals D1 to D3 of the digital signal are 0, the steady-state short-circuit switch 8 is turned ON (the signal Z is 1), the instantaneous dip change-over switch 9 is turned ON (the signal Y is 1) and the instantaneous dip compensating switch 10 is turned OFF (the signal X is 0). Thus, a current flows into the steady-state short-circuit switch 8. At this time, the charging capacitors 11 are charged to a predetermined voltage by the charging transformer 200. The charging transformer 200 may have a small capacity because the charging transformer 200 operates only for charging the charging capacitors 11.

Next, the compensating operation at the time of an instantaneous dip will be described with reference to FIG. 3.

Assume that a voltage dip occurs instantaneously in the system voltage at a time t0. An error voltage occurs in the output of the error amplifier 26 after the time t0. In response to the error voltage, the bit signals D1 to D3 of the digital signal are generated in the output of the A/D converter 27 in accordance with the error voltage. At the same time, the signal Z becomes 0 so that the steady-state short-circuit switch 8 is turned OFF.

In the period from the time to t0 a time t1, the polarity of the system voltage is positive. Thus, the bit signals D1 to D3 of the digital signal are transmitted to the p-side devices respectively. When the least significant bit signal D1 is 1, Xp1 and Yp1 take 1 and 0 respectively in the voltage compensating circuit P1. Thus, the instantaneous dip compensating switch 10p1 is turned ON, and the instantaneous dip change-over switch 9p1 is turned OFF. As a result, the voltage Vp1 of the charging capacitor 11p1 is outputted from the instantaneous dip compensating switch 10p1. When the bit signal D2 is 1, Xp2 and Yp2 take 1 and 0 respectively in the voltage compensating circuit P2. Thus, the instantaneous dip compensating switch 10p2 is turned ON, and the instantaneous dip change-over switch 9p2 is turned OFF. As a result, the voltage Vp2 of the charging capacitor 11p2 is outputted from the instantaneous dip compensating switch 10p2. In the same manner, when the most significant bit signal D3 is 1, the voltage Vp3 of the charging capacitor 11p3 is outputted in the voltage compensating circuit P3. Incidentally, when, of the bit signals D1 to D3 of the digital signal, there is a bit signal of 0, for example, when the least significant bit signal D1 is 0, Xp1 and Yp1 take 0 and 1 respectively in the voltage compensating circuit P1. Thus, the output terminal is short-circuited by the instantaneous dip change-over switch 9p1 so that the output from the voltage compensating circuit P1 becomes zero substantially. The outputs from the voltage compensating circuits P1 to P3 are combined in the system so that voltage outputs of the eight gradations "000" to "111" can be generated. The maximum compensating voltage becomes 7×Vp1.

In the period from the time t1 to a time t2, the polarity of the system voltage is negative. Therefore, the bit signals D1 to D3 of the digital signal are transmitted to the n-side devices respectively. Compensating voltages are outputted in the voltage compensating circuits N1 to N3 in the same manner. The maximum compensating voltage becomes 7×Vn1.

Figure 4:
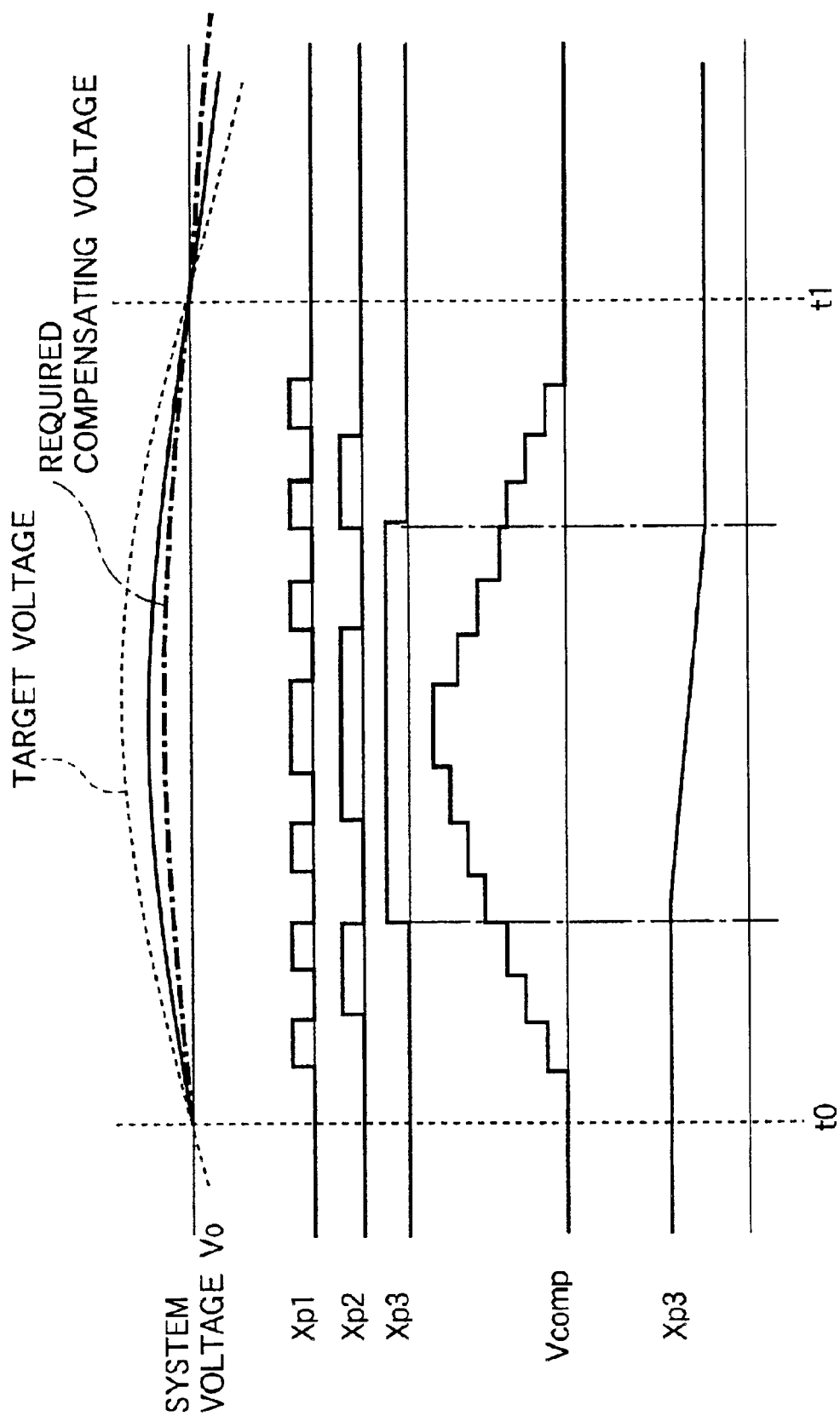
FIG. 4 is a waveform diagram for explaining the operation of charging capacitors at the time of a voltage dip according to the first embodiment of the invention.

The above description shows an ideal operation in no consideration of a change of voltage in any charging capacitor 11. Actually, however, there is a limit in the capacitor capacity. Accordingly, there occurs a sag (voltage dip) in the charging capacitor 11. For example, assume that there occurs a sag in the charging voltage Vp3 of the charging capacitor 11p3. In this case, when a binary signal (D1 to D3) as described above is formed by use of the voltage instantaneous dip control circuit 16 shown in FIG. 2 so that the voltage compensating operation is carried out, distortion occurs in the generated compensating voltage due to the sag of the charging voltage Vp3 as shown in FIG. 4.

Therefore, the A/D conversion with which the binary signal is outputted from the A/D converter 27 shown in FIG. 2 is preferably carried out in consideration of the sag of each charging capacitor 11. Such A/D conversion will be described below.

Figure 5:
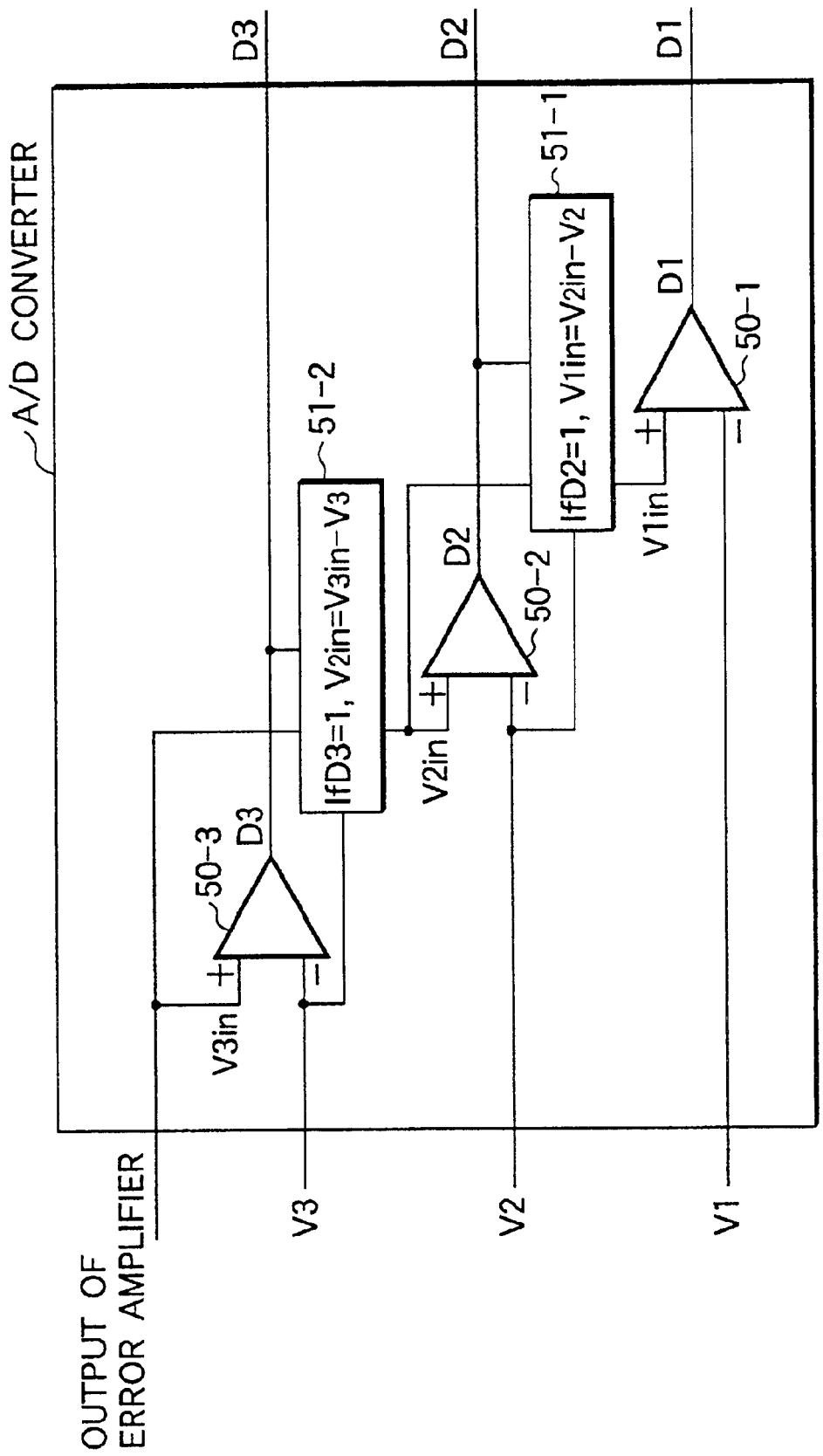
FIG. 5 is a configuration diagram showing the details of an A/D converter according to the first embodiment of the invention.

FIG. 5 is a configuration diagram showing the details of the A/D converter 27 for carrying out A/D conversion in consideration of the voltage dip in each charging capacitor 11. In FIG. 5, there are provided comparators 50 (50-1, 50-2, 50-3), and arithmetic circuits 51-1, 51-2 using arithmetic processors. In addition, the charging capacitor 11 in each of the voltage compensating circuits P1 to P3 and N1 to N3 has a voltage detector for monitoring a voltage. Detected voltage values V3, V2 and V1 are supplied to the A/D converter 27. In this case, it is assumed that V3, V2 and V1 are detected voltage values of the charging capacitors 11p3, 11p2 and 11p1 of the p-side devices respectively (see FIG. 1).

As shown in FIG. 5, first, the output V3*in* of the error amplifier 26 is compared with the voltage V3 by the comparator 50-3. The bit signal D3 is formed to be 1 when V3*in*≦V3 and 0 when V3*in*≦V3. Next, in the arithmetic circuit 51-2, the relation V2*in*=V3*in*–V3 is established when D3 is 1, and the relation V2*in*=V3*in* is established when D3 is 0. Here, V2*in* designates a voltage failing in compensation when a compensating voltage is outputted in the signal state of D3. Next, V2*in* and V2 are compared with each other in the comparator 50-2, and the bit signal D2 is outputted. Next, V1*in* is operated in the arithmetic circuit 51-1 in the same manner as V2*in*. V1*in* designates a voltage short of compensation when a compensating voltage is outputted in the signal state of D3 and D2. Finally, V1*in* and V1 are compared with each other in the comparator 50-1, and the bit signal D1 is determined.

In such a manner, when the output of the error amplifier 26 in which the voltage dip amount of the power system has been amplified is A/D-converted into a binary signal (D1 to D3) by the A/D converter 27 as shown in FIG. 5, respective bit signals of the binary signal are determined on the basis of check with the detected voltage values V3, V2 and V1 obtained by detecting the voltages of the charging capacitors 11 at any time. Accordingly, the signal for selectively operating the voltage compensating circuits P1 to P3 and N1 to N3 is determined in accordance with the voltage states of the charging capacitors 11 so that accurate compensation can be achieved. Thus, even if there occurs a sag in any charging capacitor 11, there occurs no distortion in the compensating voltage. Consequently, the electrostatic capacity values of the charging capacitors 11 can be reduced.

Further, the total compensating circuit 120 constituted by the plurality of voltage compensating circuits N1, P1, N2, P2, N3 and P3 connected in series is connected in series to the power system directly in the first embodiment. Accordingly, a large-scale transformer as used in the related art is not required. In addition, the high-speed mechanical steady-state short-circuit switch 8 is provided to be connected in parallel with the total compensating circuit 120 so that the steady-state short-circuit switch 8 makes electric continuity to bypass the current when the system voltage V0 is normal. Accordingly, the apparatus loss becomes substantially zero at the normal time. The cooling unit may have low capacity so that the apparatus as a whole can be made low in cost and small in size.

On the other hand, when the system voltage dips instantaneously, a combination is selected, by digital gradation control, from the plurality of voltage compensating circuits N1, P1, N2, P2, N3 and P3 having the charging capacitors 11 charged to different voltages respectively. Thus, voltage compensation is carried out by the total sum of the output voltages so that fine-tuned voltage compensation can be achieved. As a result, an output filter can be omitted or reduced in scale. In addition, although a response delay corresponding to the band of the output filter occurs in the case of PWM control generally used, voltage can be compensated for in real time in this embodiment because the control system adopts digital gradation control. Thus, voltage compensation can be achieved with higher accuracy.

In addition, the voltages charged in the charging capacitors 11 in the respective voltage compensating circuits P1 to P3 and N1 to N3 are selected in the relationship $Vn3 = 2 \times Vn2 = 2 \times 2 \times Vn1$ (similar relationship is applied to p). Accordingly, the compensating voltage can be controlled by gradations at an equal interval and with high accuracy.

Further, the charging capacitors 11 can be charged gradually through the charging transformer 200 connected to the power system at the normal time of the system voltage. Accordingly, it is sufficient that the charging transformer 200 has low capacity. The charging circuit becomes small in scale and low in cost. In addition, charging is carried out automatically so that the apparatus is simplified.

In the embodiment, V3, V2 and V1 used in the A/D converter 27 were set to detected voltage values of the charging capacitors 11p3, 11p2 and 11p1 on the p-side devices respectively. However, when the magnitude of the voltage dipping instantaneously is substantially constant regardless of the polarity of the system voltage, the absolute values of voltages detected on either the p-side devices or the n-side devices may be used because the voltage states of the respective charging capacitors 11n on the n-side devices change substantially in the same manner as those on the p-side devices.

Alternatively, two A/D converters 27 for the p-side devices and the n-side devices may be provided to receive detected voltage values of corresponding charging capacitors 11 and generate binary signals (D1 to D3) respectively. In this case, one of output signals from the two A/D converters 27 is selectively used correspondingly to the output of the polarity judging circuit 29 (see FIG. 2). Thus, compensation with higher accuracy can be achieved.

Furthermore, voltage detectors may be provided for the p-side devices and the n-side devices respectively. In this case, either the p-side voltage detector or the n-side voltage detector is selectively used correspondingly to the output of the polarity judging circuit 29 so that the detected voltage value of the selected voltage detector is used.

Figure 6:
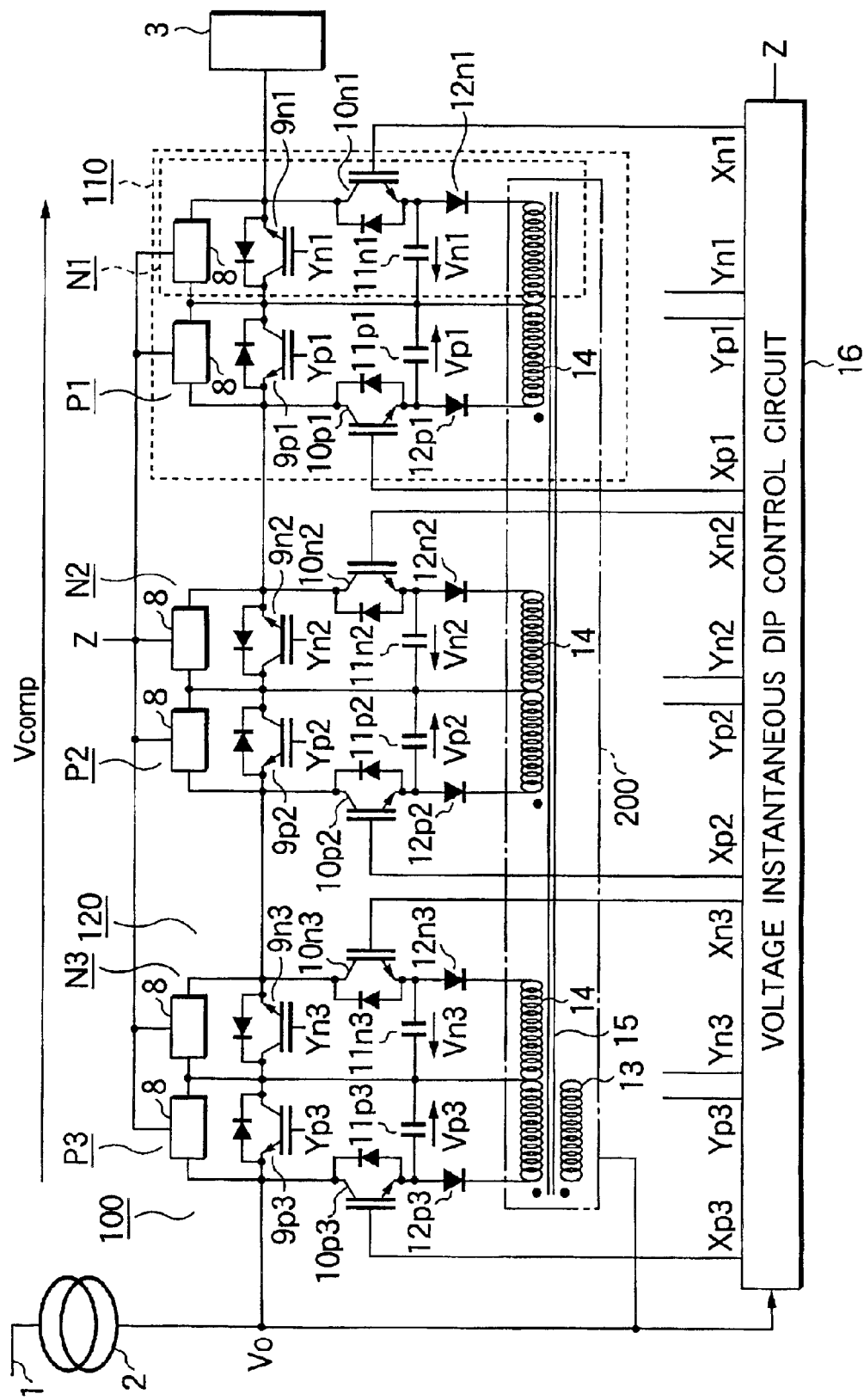
FIG. 6 is a configuration diagram of a voltage fluctuation compensating apparatus according to a modification of the first embodiment of the invention.

Further, although one steady-state short-circuit switch 8 was provided in the output terminal of the total compensating circuit 120 and in parallel with the total compensating circuit 120 in the first embodiment, one steady-state short-circuit switch 8 may be provided in the output terminal of each of the voltage compensating circuits P1 to P3 and N1 to N3 and in parallel therewith respectively, as shown in FIG. 6. Alternatively, one steady-state short-circuit switch 8 may be provided in the output terminal of each compensating unit 110 constituted by a pair of voltage compensating circuits P and N. Even when a plurality of steady-state short-circuit switches 8 are provided in such a manner, the control system is similar to that in the case where one steady-state short-circuit switch 8 is provided. At the normal time, all the steady-state short-circuit switches 8 are closed to bypass all the voltage compensating circuits P1 to P3 and N1 to N3. At the time of a voltage dip of the power system, all the steady-state short-circuit switches 8 are opened so that the voltage outputs from the voltage compensating circuits P1 to P3 and N1 to N3 compensate for the voltage dip of the power system.

Figure 7A:
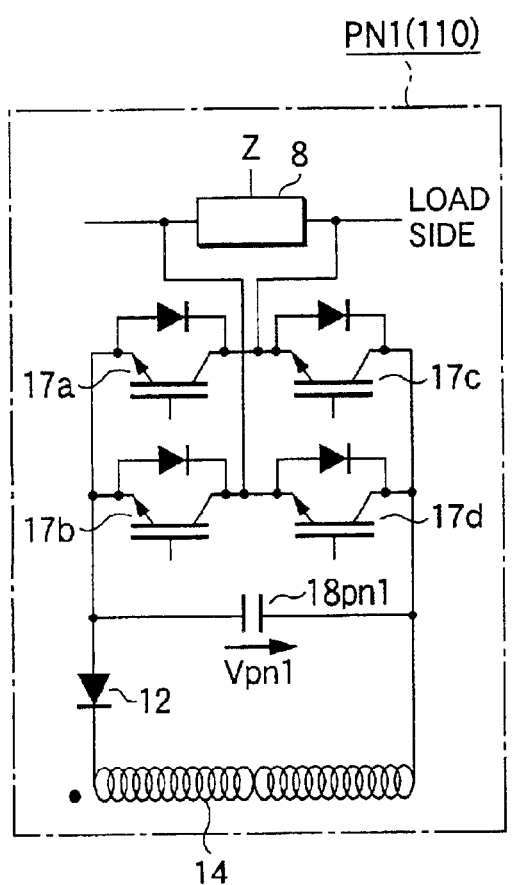
FIGS. 7A and 7B are configuration diagrams of voltage compensating circuits according to other modifications of the first embodiment of the invention.
Figure 7B:
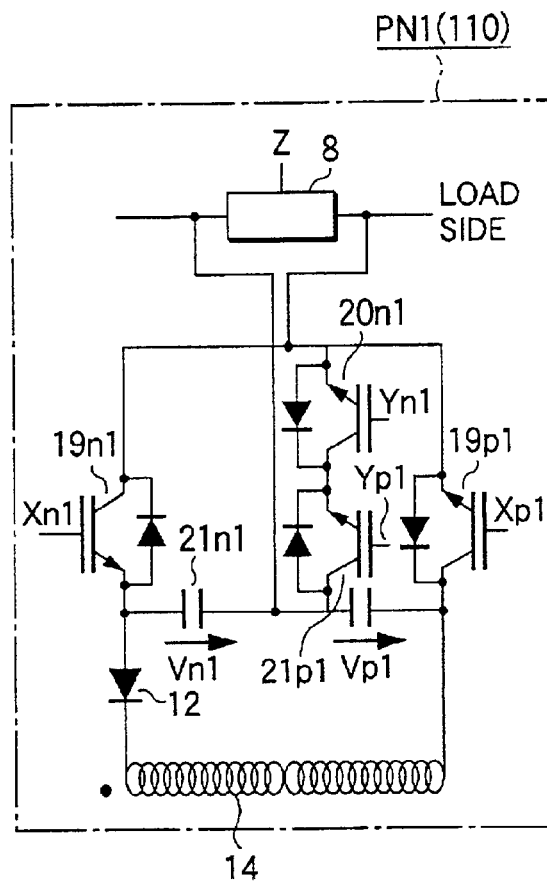

Furthermore, although each compensating unit 110 was constituted by a pair of voltage compensating circuits P and N in the first embodiment, each compensating unit 110 that can output positive and negative voltages may be constituted by one voltage compensating circuit PN as shown in FIG. 7A or 7B.

In the example shown in FIG. 7A, a voltage compensating circuit PN1 has a full bridge inverter, and a charging capacitor 18 as an energy storage unit. The full bridge inverter is constituted by four semiconductor switching devices 17a to 17d in which diodes have been connected in anti-parallel. A charging voltage Vpn1 of the charging capacitor 18 is connected to the power system with either positive polarity or negative polarity in accordance with the ON/OFF control of the semiconductor switching devices 17a to 17d. On the other hand, in the example shown in FIG. 7B, a voltage compensating circuit PN1 has a half bridge inverter, an instantaneous dip change-over switch, and charging capacitors 21p1 and 21n1 as an energy storage unit. The half bridge inverter is constituted by two semiconductor switching devices 19p1 and 19n1 in which diodes have been connected in anti-parallel with each other. In the instantaneous dip change-over switch, two semiconductor switching devices 20p1 and 20n1 in which diodes have been connected in anti-parallel with each other are connected in series but in reverse. The instantaneous dip change-over switch is connected in parallel with the output terminal of the voltage compensating circuit PN1. A compensating voltage with either positive polarity or negative polarity is outputted in accordance with the ON/OFF control of the semiconductor switching devices 19 and 20.

Second Embodiment

Next, a second embodiment of the invention will be described below in detail.

Figure 8:
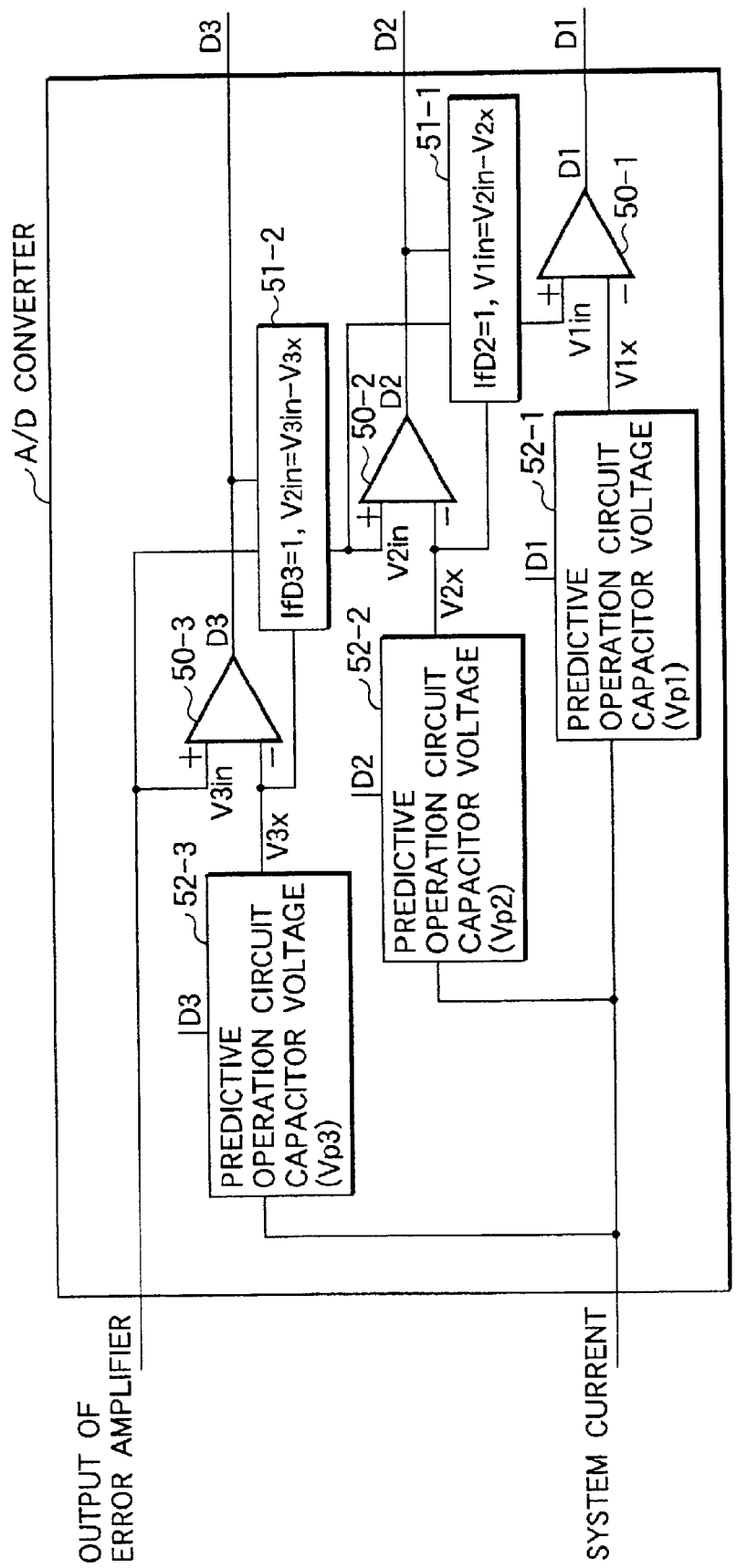
FIG. 8 is a configuration diagram showing the details of an A/D converter according to a second embodiment of the invention.

FIG. 8 is a configuration diagram showing the details of an A/D converter 27 according to a second embodiment of the invention. As shown in FIG. 8, the A/D converter 27 has predictive operation circuits 52 (52-1, 52-2 and 52-3) for carrying out predictive operations on voltages of charging capacitors 11 respectively. In addition, a system current of the power system is monitored. A current value of the system current and a corresponding bit signal of a digital signal (D1 to D3) which is an output from this A/D converter 27 are supplied to each predictive operation circuit 52. In each predictive operation circuit 52, a voltage value of a corresponding charging capacitor 11 is predictively operated on the basis of the current value of the system current and the supplied bit signal (one of D1 to D3) of the digital signal. The results of the operations in the respective predictive operation circuits 52 are outputted as predictive operated voltage values V1x to V3x which are calculated voltage values. The predictive operated voltage values V1x to V3x are supplied to comparators 50 (50-1, 50-2 and 50-3) in place of the detected voltage values V1 to V3 shown in FIG. 5 in the first embodiment. The other operations of the A/D converter 27 are similar to those in the A/D converter 27 shown in FIG. 5 in the first embodiment. Thus, the respective bit signals (D1 to D3) of the digital signal are outputted.

Figure 9:
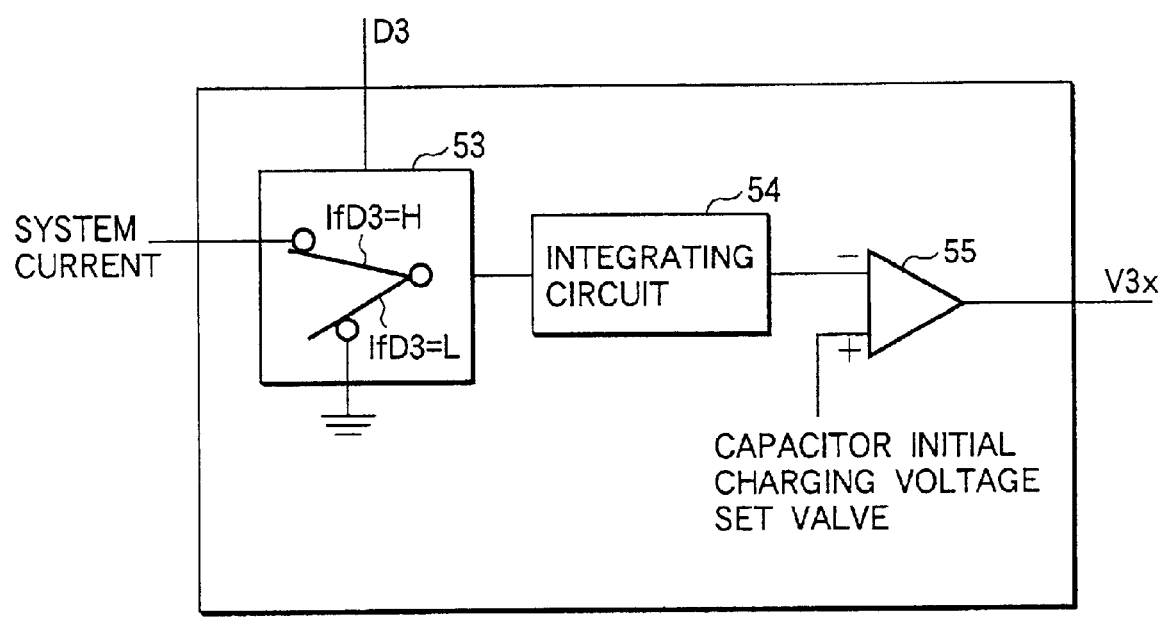
FIG. 9 is a configuration diagram showing the details of a predictive operation circuit according to the second embodiment of the invention.

FIG. 9 shows an example of each predictive operation circuit 52. Here, the predictive operation circuit 52-3 for carrying out predictive operation on the voltage of a charging capacitor 11p3 (or 11n3) is shown representatively. In the period in which the bit signal D3 of the digital signal is 1, a voltage compensating circuit P3 outputs a compensating voltage from the charging capacitor 11p3, and the current value of the system current is supplied to an integrating circuit 54 and integrated therein. As a result, the voltage dip amount of the charging capacitor 11p3 is operated and outputted as the output of the integrating circuit 54. In a subtractor 55, the output of the integrating circuit 54 is subtracted from an initial charging voltage set value Vp3 of the charging capacitor 11p3. Thus, a voltage predicative operation value V3x of the charging capacitor 11p3 is obtained.

When the output of the error amplifier 26 in which the voltage dip amount of the power system has been amplified is A/D converted into a binary signal (one of D1 to D3) by use of the A/D converter 27 as shown in FIG. 8, the voltages of the charging capacitors 11 are checked with the predictive operated voltage values V3x, V2x and V1x calculated at any time in such a manner by predictive operations. Thus, the respective bit signals of the binary signal are determined. Accordingly, in the same manner as in the first embodiment, the signal for selectively operating the voltage compensating circuits P1 to P3 and N1 to N3 can be determined in accordance with the voltage states of the charging capacitors 11 so that accurate compensation can be achieved. Thus, even if there occurs a sag in any charging capacitor 11, there occurs no distortion in the compensating voltage. Consequently, the electrostatic capacity values of the charging capacitors 11 can be reduced. Further, since calculated voltage values based on predictive operations of the voltages of the charging capacitors 11 are used, no voltage detector is provided in any capacitor 11. Accordingly, the effect can be obtained with an apparatus configuration low in cost.

Third Embodiment

Next, a third embodiment of the invention will be described below in detail.

Figure 10:
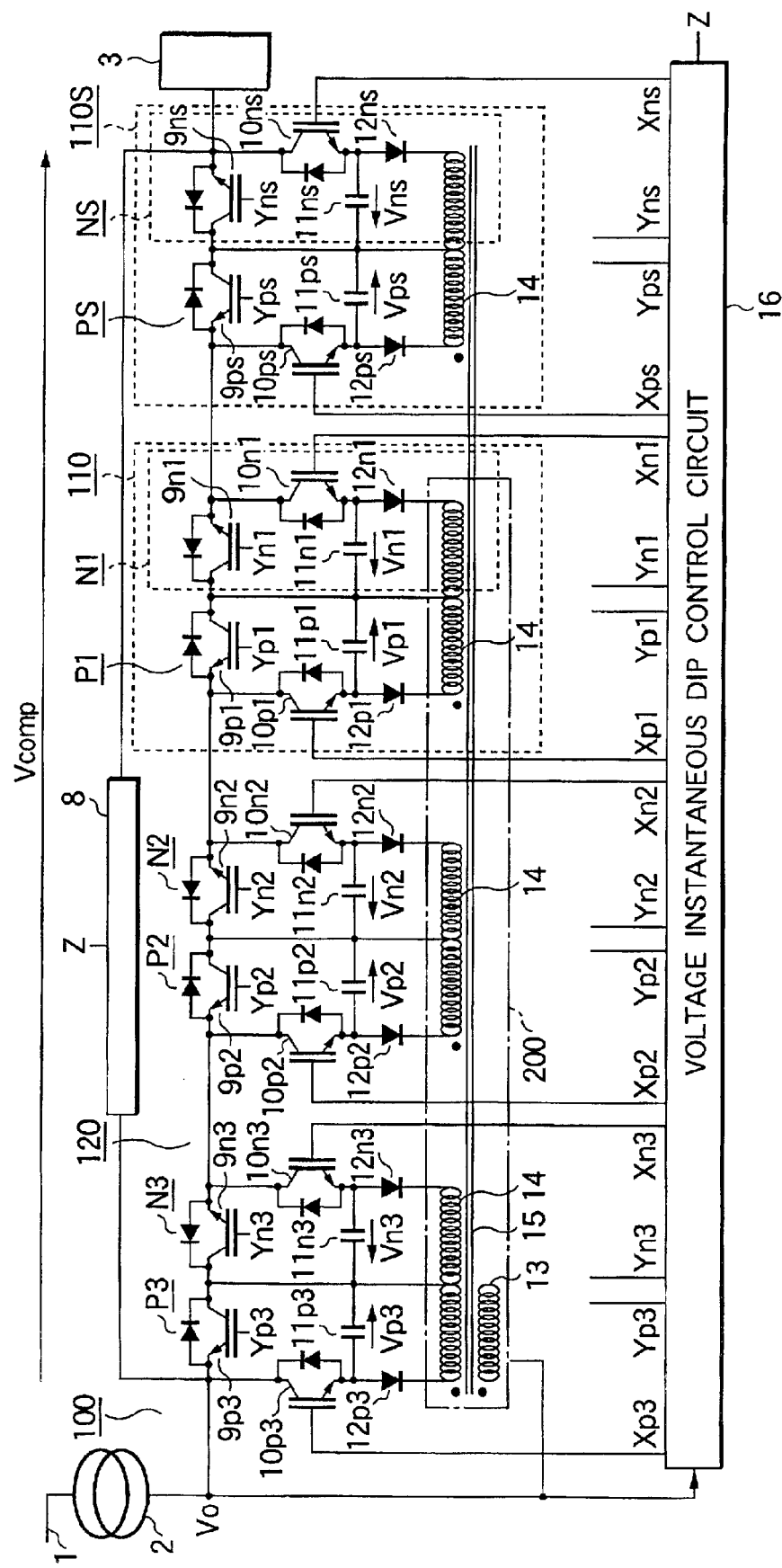
FIG. 10 is a configuration diagram of a voltage fluctuation compensating apparatus according to a third embodiment of the invention.

FIG. 10 is a configuration diagram of a voltage fluctuation compensating apparatus according to a third embodiment of the invention. As shown in FIG. 10, a sag compensating unit is provided as well as the three compensating units 110 shown in FIG. 1 in the first embodiment. The sag compensating unit 110S has a configuration similar to that of any other compensating unit 110. The sag compensating unit 110S is constituted by two sag voltage compensating circuits PS and NS taking charge of generating positive and negative voltages respectively. Each of the sag voltage compensating circuits PS and NS has an instantaneous dip change-over switch 9 provided in parallel with an output terminal thereof, an instantaneous dip compensating switch 10, a charging capacitor 11 as an energy storage unit, and a charging diode 12 and a secondary winding 14 of a charging transformer 200 for charging the charging capacitor 11. A charging voltage of the charging capacitor 11 is connected to the power system through the instantaneous dip compensating switch 10 connected in series with the charging capacitor 11.

Figure 11:
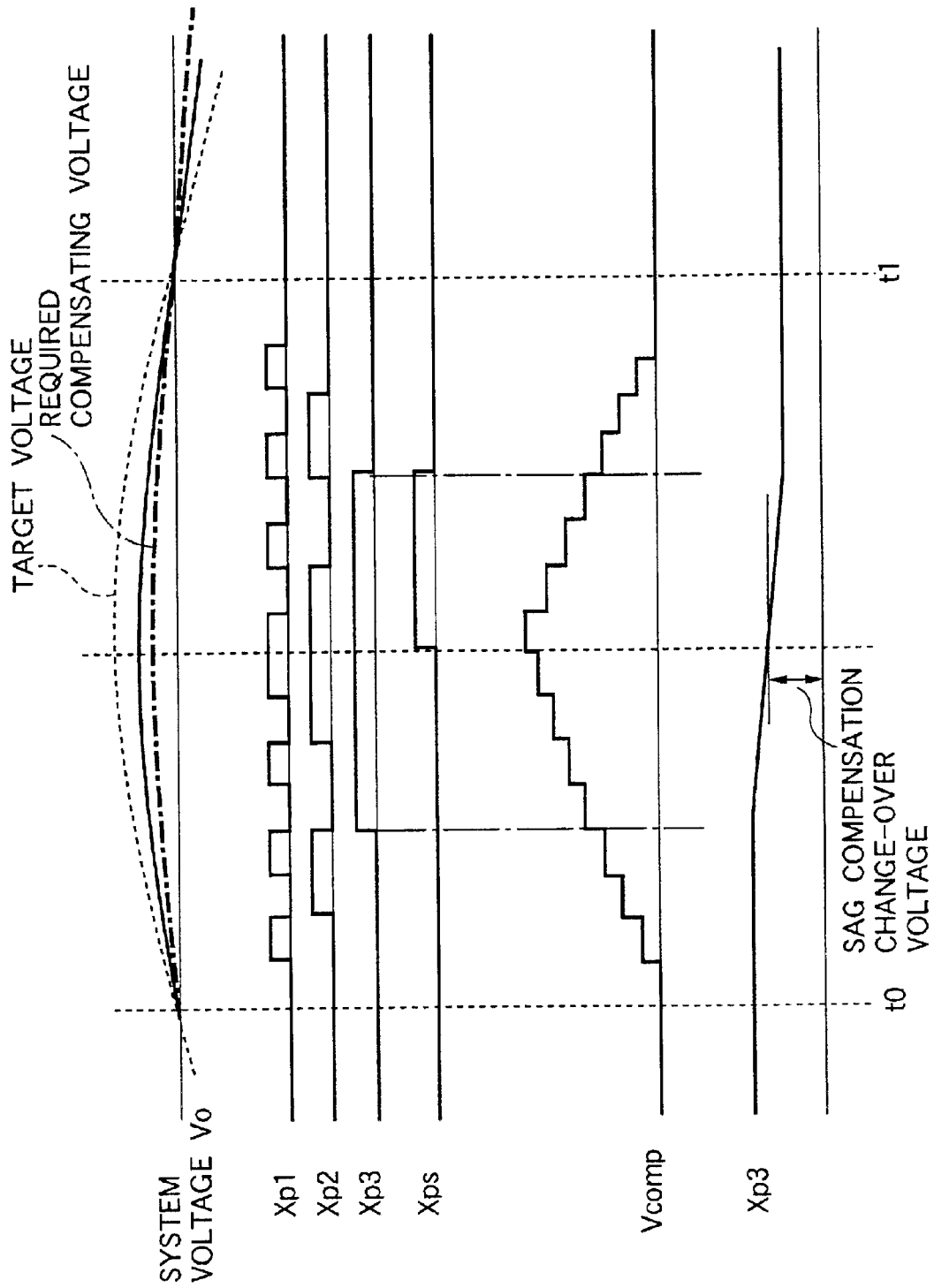
FIG. 11 is a wave form diagram for explaining the operation of the voltage fluctuation compensating apparatus according to the third embodiment of the invention.

The voltage compensating operation in the voltage fluctuation compensating apparatus 100 configured thus will be described with reference to FIG. 11. In FIG. 11, there is shown a driving signal Xps for an instantaneous dip compensating switch 10ps in the sag voltage compensating circuit PS.

When a sag occurs in the charging voltage Vp3 of the charging capacitor 11p3, waveform distortion occurs in the compensating voltage as described previously. The sag voltage compensating circuit PS is operated to correct such waveform distortion caused by the sag. That is, in FIG. 11, when the voltage Vp3 dips to be equal to or lower than a predetermined sag compensation change-over voltage, such a voltage dip is detected, and the driving signal Xps is made 1. Thus, the sag voltage compensating circuit PS outputs a compensating voltage whenever the driving signal Xp3 is 1. The sag compensation change-over voltage is, for example, set at the point where the voltage dip amount of Vp3 coincides with the initial charging voltage value of the charging capacitor voltage Vps of the sag voltage compensating circuit PS. As a result, the sag of Vp3 is corrected by the sag voltage compensating circuit PS so that the compensating voltage has a waveform with less distortion.

Figure 12:
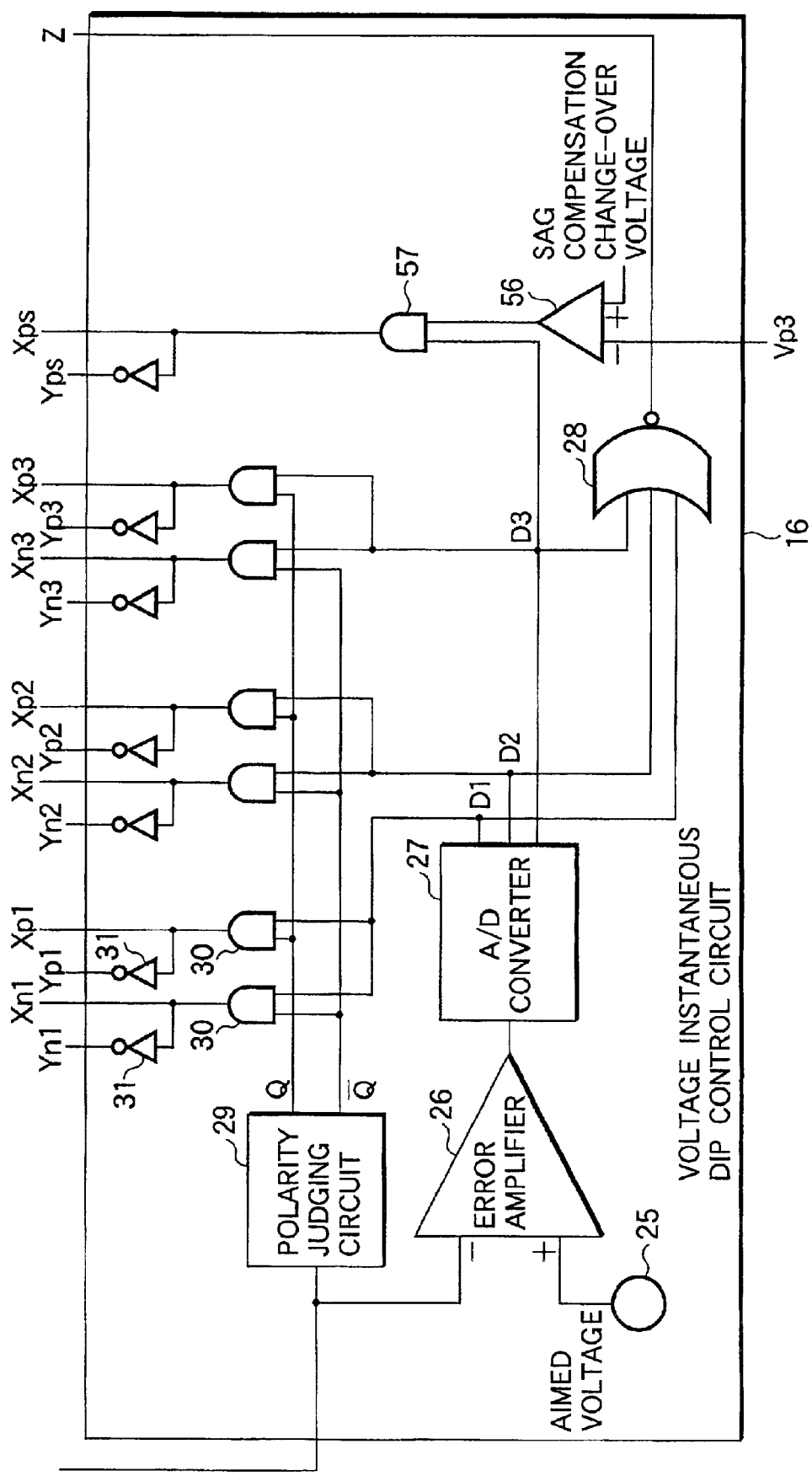
FIG. 12 is a circuit diagram showing the details of a voltage instantaneous dip control circuit according to the third embodiment of the invention.

FIG. 12 explains a voltage instantaneous dip control circuit 16 according to the third embodiment. For example, the voltage instantaneous dip control circuit 16 corrects the sag of Vp3. The voltage instantaneous dip control circuit 16 is designed to use a comparator 56 and an AND circuit 57 to allow the sag voltage compensating circuit PS to carry out the voltage compensating operation when Vp3 becomes equal to or lower than the sag compensation change-over voltage. Accordingly, even when there occurs a sag in the voltage of the charging capacitor 11, there occurs no waveform distortion. Consequently, the electrostatic capacity value of the charging capacitor 11 can be reduced on a large scale. Thus, the apparatus can be arranged at low cost.

Incidentally, although all the description in the embodiment was made on the p-side devices, similar rules are applied to the n-side devices. The sag in Vn3 is corrected by the sag voltage compensating circuit NS.

Further, although description was made on the case where the sag in the voltage of the charging capacitor 11p3, 11n3 was corrected, a sag voltage compensating circuit for correcting a sag of another charging capacitor 11 may be provided.

Fourth Embodiment

A fourth embodiment of the invention will be described. In this the fourth embodiment, description will be made on a method for setting the voltages of the charging capacitors 11 in the respective compensating units 100.

Since each charging capacitor 11 has only a limited electrostatic capacity, a sag is sure to occur. When the sag increases, a voltage that can be compensated for is reduced. Therefore, a high charging voltage is set for the charging capacitor 11 in advance so as to be able to compensate for the voltage dip amount of the system voltage even if there occurs a sag. For example, on the assumption that the maximum voltage dip amount in a voltage dip of the system voltage (within a predetermined duration) is $\Delta Vmax$, the respective voltages are set as follows.

$$Vp3, Vn3 > (\Delta Vmax/7) \times 4$$

$$Vp2, Vn2 > (\Delta Vmax/7) \times 2$$

$$Vp1, Vn1 > (\Delta Vmax/7) \times 1$$

In some way of setting, there is a possibility that the relationship among the respective voltages is shifted slightly from the relationship of $2^k$-fold (K=0, 1 or 2) as described above. If the voltages are approximately in the relationship of $2^k$-fold, there is no fear that the accuracy of the compensating voltage is lowered.

By setting the voltages thus, even if there occurs a sag in the charging capacitors 11, an adequate compensating voltage can be secured though the voltage is lowered. Consequently, the electrostatic capacity values of the charging capacitors can be designed to be small so that the apparatus can be achieved at low cost.

Fifth Embodiment

Next, a fifth embodiment of the invention will be described. In this the fifth embodiment, description will be made on a method for setting the electrostatic capacity values of the charging capacitors 11 in the respective compensating units 100.

As described previously, since each charging capacitor 11 has only a limited electrostatic capacity, a sag is sure to occur. Accordingly, for example, when the same electrostatic capacity value is selected for each of the charging capacitors 11, the charging capacitors 11 have sags with substantially the same magnitude. However, since the ratios of the sags to their initial charging voltages are different, the relationship of approximately $2^k$-fold in the voltages is broken. Therefore, the electrostatic capacity values are selected as follows. Incidentally, for example, Cp1 designates the electrostatic capacity value of the charging capacitor 11p1.

$$Cp1(Cn1) \approx 2 \times Cp2(Cn2)$$

$$Cp2(Cn2) \approx 2 \times Cp3(Cn3)$$

In such a manner, each of the electrostatic capacities of the charging capacitors 11 is set to be lowered as its charging voltage increases. Thus, the relationship of approximately $2^k$-fold is also given to the electrostatic capacity values. As a result, when the same current flows into the charging capacitors 11, the ratios of sags to their initial charging voltages coincide with one another, so that the relationship of approximately $2^k$-fold is kept in the relationship among the voltages of the charging capacitors 11 when there occurs a sag. Accordingly, even if there occurs a voltage sag, accurate voltage compensation can be achieved.

Incidentally, the electrostatic capacity values of the respective charging capacitors 11 may be selected as follows.

$$Cp1(Cn1) \geq 2 \times Cp2(Cn2)$$

$$Cp2(Cn2) \geq 2 \times Cp3(Cn3)$$

By such setting, the voltage of the charging capacitor 11 having a low charging voltage is difficult to dip even if the same current flows into the respective charging capacitors. Thus, the relationship of approximately $2^k$-fold becomes difficult to break, so that accurate voltage compensation can be achieved even if there occurs a voltage sag.

Sixth Embodiment

Next, a sixth embodiment of the invention will be described.

When the apparatus specifications are determined, it is generally necessary to take into consideration the maximum guaranteed voltage dip value in the customer 3 at the time of an instantaneous dip. For example, when the maximum guaranteed voltage dip value is Vz, it is necessary to carry out voltage compensation with which the voltage dip amount of a voltage supplied to the customer 3 becomes not higher than Vz.

Now assume that the minimum voltage Vp1, Vn1 of the charging capacitor 11 is set to be higher than this guaranteed voltage dip value Vz. In this case, when the remaining compensating voltage predicted after D2 and D3 are determined is not higher than V1, even if it is not lower than Vz, D1 will not be set to 1, for example, in the A/D conversion of the A/D converter 27 shown in FIG. 5. Accordingly, although the voltage fluctuation compensating apparatus 100 has an ability to supply voltage, the voltage supplied to the customer will be lower than that at the normal time by Vz or more.

Thus, description will be made below on the A/D conversion in the case where the minimum voltage Vp1, Vn1 of the charging capacitor 11 is set to be larger than the guaranteed voltage dip value Vz.

Figure 13:
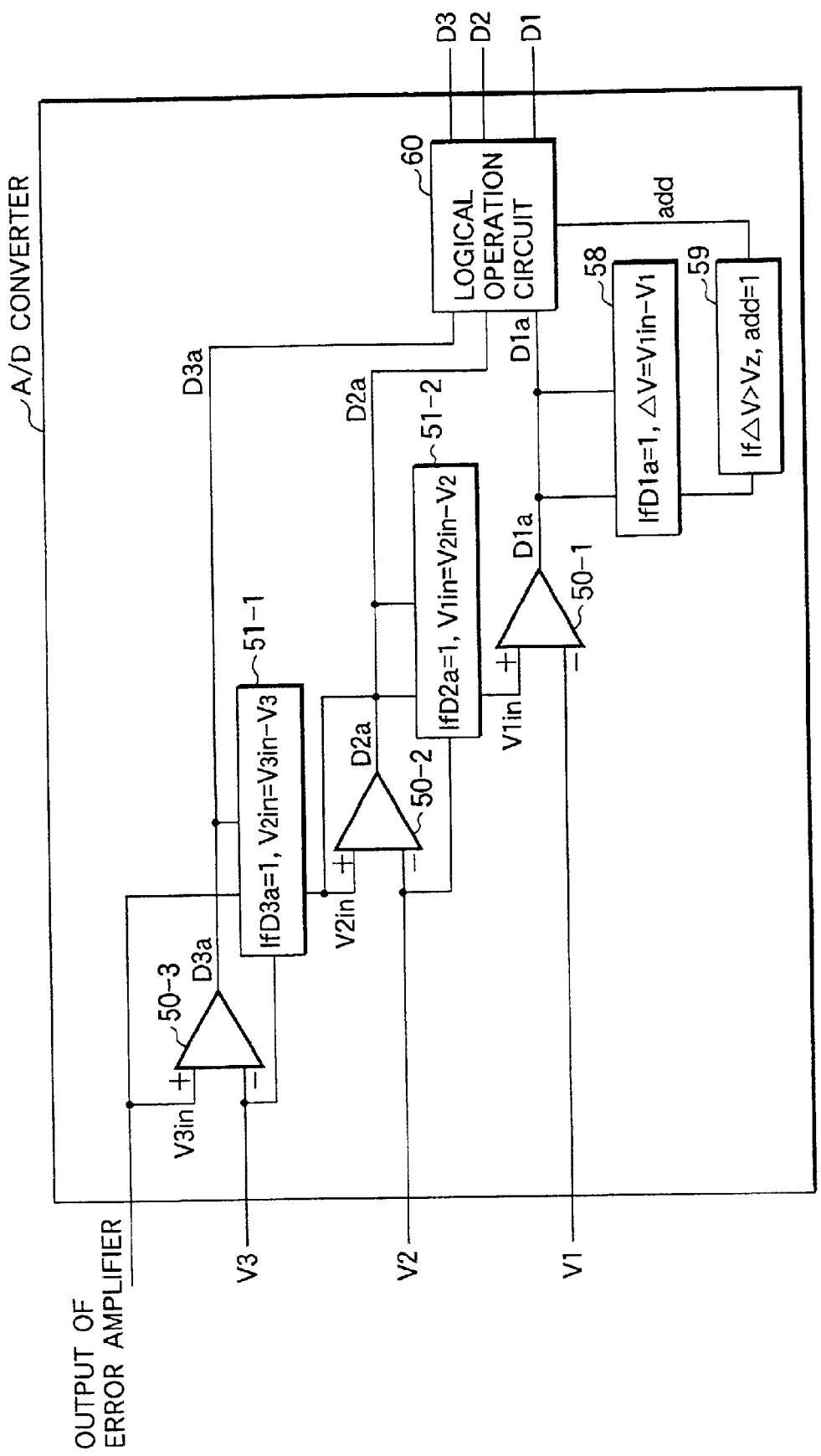
FIG. 13 is a configuration diagram showing the details of an A/D converter according to a sixth embodiment of the invention.

FIG. 13 is a configuration diagram showing the details of an A/D converter 27 according to the sixth embodiment.

As shown in FIG. 13, the output V3*in* of the error amplifier 26 is compared with the voltage V3 by a comparator 50-3. A bit signal D3*a* is formed to be 1 when V3*in*≧V3 and 0 when V3*in*<V3. Next, in an arithmetic circuit 51-1, the relation V2*in*=V3*in*-V3 is set when D3*a* is 1, and the relation V2*in*=V3*in* is set when D3*a* is 0. Here, V2*in* designates a voltage failing in compensation when a compensating voltage is outputted in the signal state of D3*a*. Next, V2*in* and V2 are compared in a comparator 50-2, and a bit signal D2*a* is outputted. Next, V1*in* is operated in an arithmetic circuit 51-2 in the same manner as V2*in*. V1*in* designates a voltage short of compensation when a compensating voltage is outputted in the signal state of D3*a* and D2*a*. Next, V1*in* and V1 are compared in a comparator 50-1, and a bit signal D1*a* is determined.

Next, a voltage ΔV failing in compensation when the respective voltage compensating circuits P and N operate in accordance with a thus-determined digital signal (D1*a* to D3*a*) and output compensating voltages is obtained by an arithmetic circuit 58. The relation add=1 is set in an arithmetic circuit 59 when ΔV≧Vz, and added to the binary number designated by the digital signal (D1*a* to D3*a*) in a logical operation circuit 60.

For example, on the assumption that D1*a*=1, D2*a*=0 and D3*a*=0, the following logical operation is executed when add=1.

001+1=010

As a result, a signal of D1=0, D2=1 and D3=0 is outputted.

In such a manner, when ΔV≧Vz, the digital signal (D1 to D3) is determined in the arithmetic circuit 59 so as to obtain a compensating power added with a voltage corresponding to the minimum voltage Vp1 (Vn1) of the charging capacitors 11. Thus, the voltage dip amount of the voltage supplied to the customer 3 becomes not higher than Vz.

In this embodiment, the function of supplying the customer 3 with a voltage not smaller than a voltage value obtained by subtracting Vz from the voltage at the normal time operates by priority even if the minimum voltage of the charging voltage of the capacitors 11 is set to be larger than the guaranteed voltage dip value. As a result, the voltages of the charging capacitors 11 in the respective voltage compensating circuits P and N can be set to be high so that the electrostatic capacities of the charging capacitors 11 can be reduced. Although the voltage supplied to the customer 3 may be higher than a normal value when such control is performed, there is no problem if the increase of the voltage is small.

Seventh Embodiment

Next, a seventh embodiment of the invention will be described.

When the voltage dip amount in the power system is comparatively small, only a voltage compensating circuit (for example, P1 or N1) having a charging capacitor 11 with a low charging voltage operates. Then, a voltage sag occurs in only such a charging capacitor 11 so that the charges are consumed suddenly.

In this the seventh embodiment, when the voltage dip amount is small as described above, the voltage sag of the charging capacitor 11 with a low charging voltage is suppressed by use of the charges of other charging capacitors 11 with higher charging voltages. This operation will be described below with reference to FIG. 14.

Figure 14:
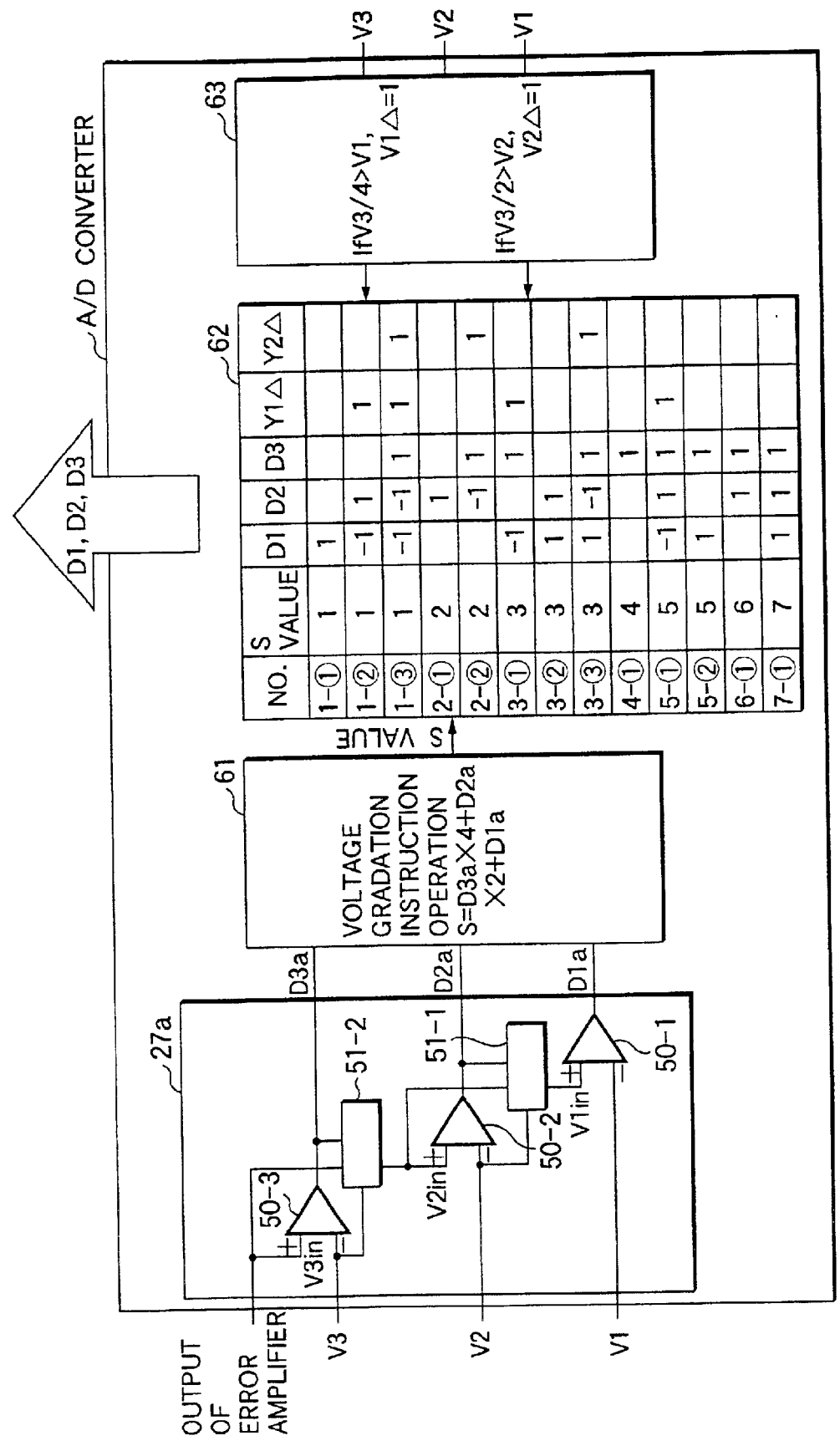
FIG. 14 is a configuration diagram showing the details of an A/D converter according to a seventh embodiment of the invention.

When a voltage compensating operation is carried out by the voltage compensating circuits P and N selected in accordance with the three-bit digital signal (D1 to D3), there are 7 combinations as voltage gradations S whose values are 1, 2, 3, 4, 5, 6 and 7. To achieve such a voltage gradation instruction, a logic table 62 shown in FIG. 14 is created. In the logic table 62, each bit (D1, D2, D3) of the digital signal can take both the values of −1 and +1. Incidentally, the logical value +1 in the logical table 62 designates a discharging operation, and −1 designates a charging operation. For example, in the voltage fluctuation compensating apparatus 100 as shown in FIG. 1, when a required compensating voltage is positive in the case where the system current and the system voltage have the same phase, the voltage compensating circuits P and N are selectively operated so that the P-side charging capacitors 11p discharge when the logical value is +1 and the N-side charging capacitors 11n charge when the logical value is −1. That is, the voltage compensating circuit P whose output voltage has the same polarity as that of the system voltage carries out a discharging operation (+1). On the other hand, the voltage compensating circuit N whose output voltage has a reverse polarity to that of the system voltage carries out a charging operation (−1). Thus, the voltage obtained by subtracting the charging voltage from the discharging voltage is outputted as a compensating voltage from the total compensating circuit 120.

That is, as is understood from the logical table 62, three combinations of binary signals can be chosen when 1 is outputted as the voltage gradation value S. For example, the voltage of a compensating unit 110 (voltage compensating circuit P1, N1) corresponding to D1 can be either charged or discharged. For example, assume that the compensating unit 110 operating in accordance with D1 is referred to as a unit 1, the compensating unit 110 (voltage compensating circuit P2, N2) operating in accordance with D2 is referred to as a unit 2, and the compensating unit 110 (voltage compensating circuit P3, N3) operating in accordance with D3 is referred to as a unit 3. To increase only the voltage of the charging capacitor 11 of the unit 1, 1-(2) is chosen. To increase the voltages of the charging capacitors 11 of both the unit 1 and the unit 2, 1-(3) is chosen. To reduce the voltage of the charging capacitor 11 of the unit 1, 1-(1) is chosen. Here, units increased in voltage are designated as V1Δ (unit 1) and V2Δ (unit 2). That is, when V1Δ is 1, the voltage of the unit 1 is increased. In short, the voltages of the units 1 to 3 can be adjusted by selecting the bit signals (D1, D2 and D3) of the digital signal in accordance with their S values and units to be increased or decreased in voltage. The voltage to be compensated is always generated as an alternating current. With respect to one AC period, it is therefore possible to adjust the voltages of both the P-side charging capacitors 11 and the N-side charging capacitors 11.

Incidentally, in the case where each compensating unit 110 outputs both positive and negative voltages from one charging capacitor 18pn as shown in FIG. 7A, when a required compensating voltage is, for example, positive in the case where the system current and the system voltage have the same phase, the compensating unit 110 operates so that the charging capacitor 18pn discharges when the logical value is +1 and the charging capacitors 18pn charges when the logical value is −1.

Next, description will be made on A/D conversion from the voltage dip amount of the system voltage into a binary signal constituted by bit signals (D1, D2 and D3) in the logical table 62 as described above.

An A/D converter 27a shown in FIG. 14 carries out the same operation as the A/D converter shown in FIG. 5. Bit signals D1a, D2a and D3a are outputted from the A/D converter 27a. A value of a voltage gradation S using the bit signals D1a, D2a and D3a is operated in an arithmetic circuit 61, and supplied to a logical table 62. The voltage gradation instruction operation in the arithmetic circuit 61 is S=D3a×4+D2a×2+D1a. In addition, in an arithmetic circuit 63, a voltage increase signal V1Δ is set to 1 when a voltage V1 is lower than a voltage obtained by dividing a monitored voltage V3 by 4. Further, a voltage increase signal V2Δ is set to 1 when a voltage V2 is lower than a voltage obtained by dividing the monitored voltage V3 by 2. That is, when the voltage increase signal V1Δ is 1, the voltage of the charging capacitor 11 in the unit 1 is lower than its binary condition when the voltage of the charging capacitor 11 in the unit 3 is used as reference. Thus, the voltage of the charging capacitor 11 in the unit 1 has to be increased. The case where the voltage increase signal V2Δ is 1 means a similar thing with respect to the charging capacitor 11 in the unit 1. The signals V1Δ and V2Δ are supplied to the logical table 62. In the logical table 62, a binary signal (D1, D2 and D3) in the column corresponding to the S value and the signals V1Δ and V2Δ is chosen.

In such a manner, bit signals (D1, D2 and D3) can be set so that the voltages of the respective charging capacitors 11 are not shifted from the relationship of approximately $2^k$-fold. Thus, accurate compensation can be always carried out. Further, when the compensating voltage is in any voltage level, not the charges of the charging capacitors 11 in only a part of the voltage compensating circuits P, N but the charges of the charging capacitors 11 in all the voltage compensating circuits P, N can be used effectively. Accordingly, even when a low compensating voltage continues for a long time, voltage compensation can be carried out surely continuously over a long time. As a result, the electrostatic capacity values of the charging capacitors 11 can be set to be small so that the apparatus can be arranged at low cost.

Eighth Embodiment

Next, an eighth embodiment of the invention will be described.

Figure 15:
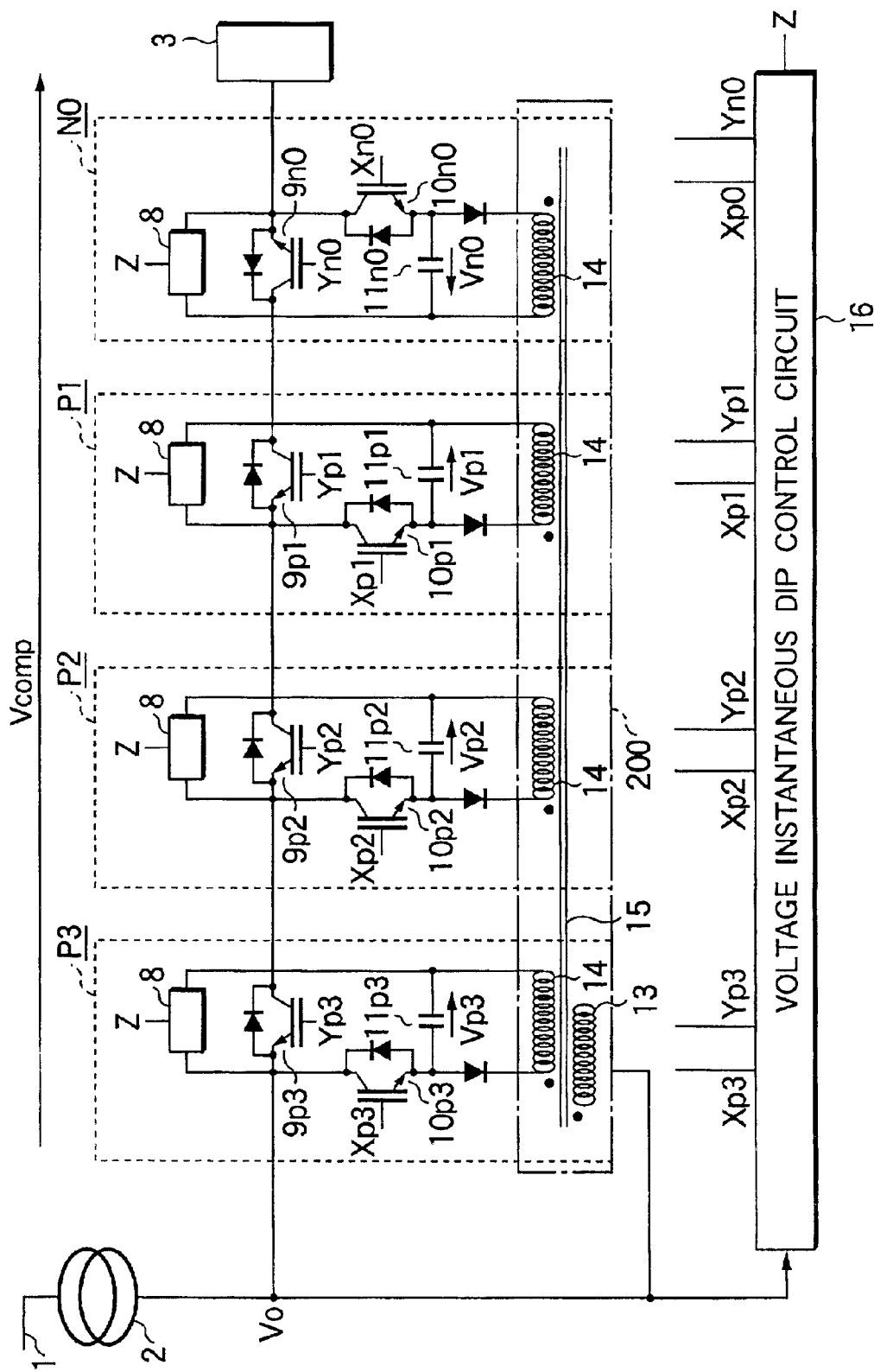
FIG. 15 is a configuration diagram of a voltage fluctuation compensating apparatus according to an eighth embodiment of the invention.

FIG. 15 is a configuration diagram of a voltage fluctuation compensating apparatus according to the eighth embodiment. As shown in FIG. 15, three voltage compensating circuits P1, P2 and P3 for outputting positive voltages and one voltage compensating circuit N0 for outputting a negative voltage are connected in series to the power system. The voltage compensating circuits P1, P2 and P3 are arranged in the same manner as those shown in the first embodiment, so that the voltages of the respective charging capacitors 11 have the relationship of approximately $2^k$-fold. The voltage compensating circuit N0 outputs a voltage which is equal to the total sum of output voltages of the three voltage compensating circuits P1, P2 and P3 and whose polarity is reverse thereto.

That is, the absolute values of the voltages of respective charging capacitors 11 have the following relationship.

$$Vp3=Vp2\times 2=Vp1\times 4$$

$$Vn0=(Vp1+Vp2+Vp3)$$

Most voltage dips of the system voltage occur due to short-circuit or ground fault in some place of the system caused by lightning or the like. Thus, a voltage to be compensated is AC. Therefore, compensating voltages are outputted from the respective voltage compensating circuits P1 to P3 and N0 so as to generate an AC compensating voltage. By a combination of these voltage compensating circuits P1 to P3 and N0, an AC voltage can be generated as follows. On the assumption that Vp1=1V, signals as shown in the table of FIG. 16 may be used to set the compensating output ranging from −7 V to 7V. Here, a control signal D1 operates the voltage compensating circuit P1. When the control signal D1 is 1, it shows a state that the voltage compensating circuit P1 should output its compensating voltage. Similarly, a control signal D2 operates the voltage compensating circuit P2, a control signal D3 operates the voltage compensating circuit P3, and a control signal D0 operates the voltage compensating circuit N0.

The voltage compensating operation by the voltage fluctuation compensating apparatus arranged thus will be described below with reference to FIG. 17. Incidentally, it is assumed that the system voltage and the system current have the same phase.

Figure 17:
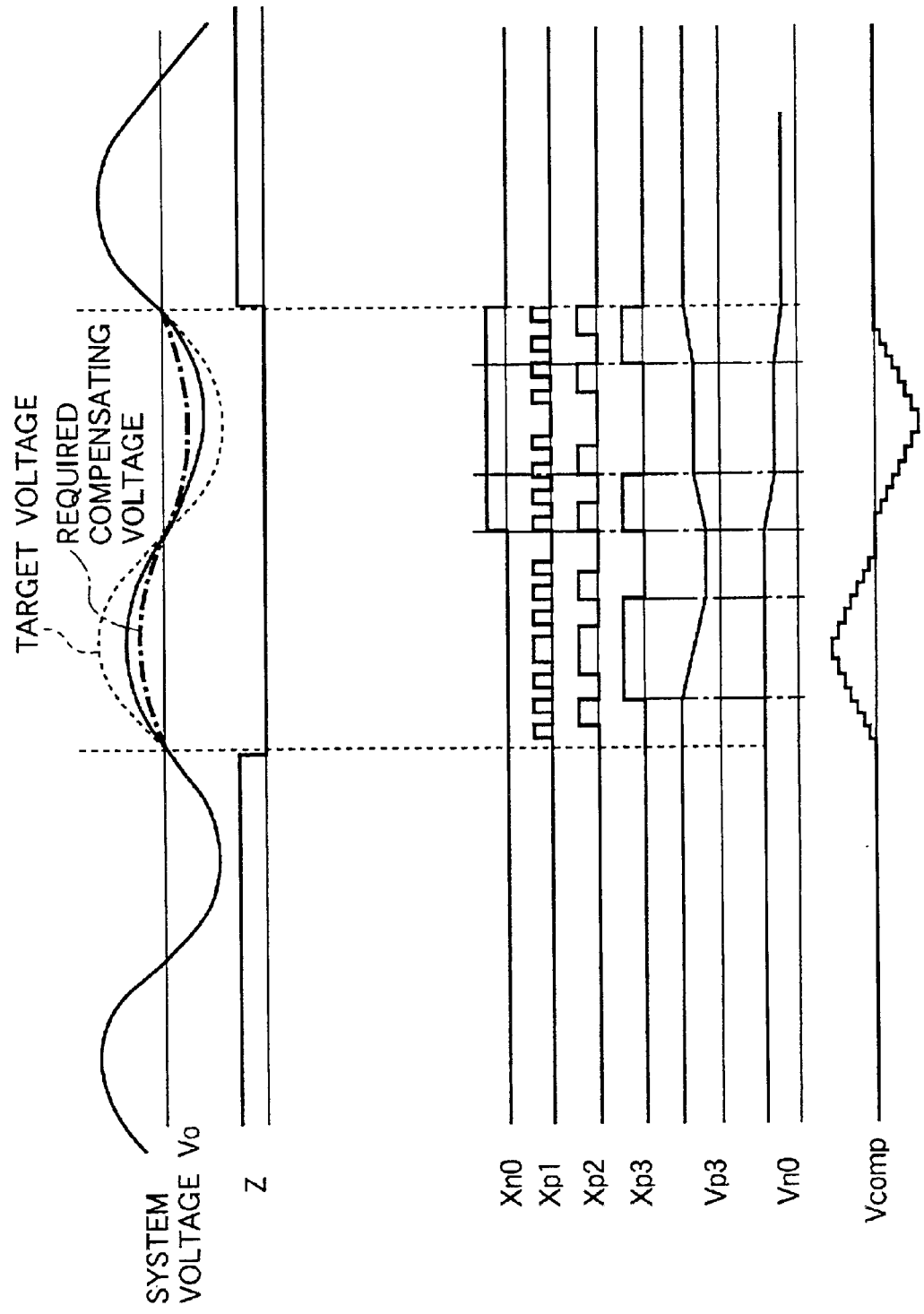
FIG. 17 is a wave form diagram for explaining the operation of the voltage fluctuation compensating apparatus according to the eighth embodiment of the invention.
Figure 18:
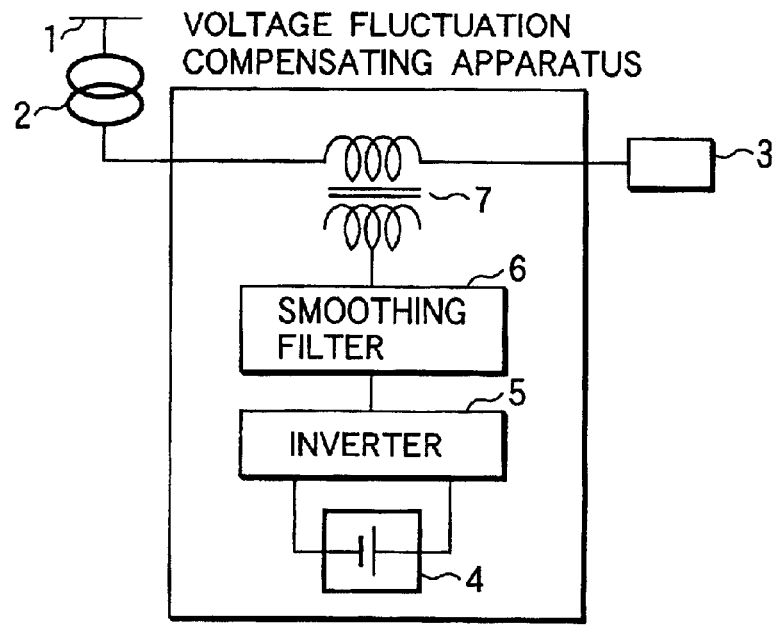
FIG. 18 is a schematic configuration diagram of a related-art voltage fluctuation compensating apparatus.
Figure 19:
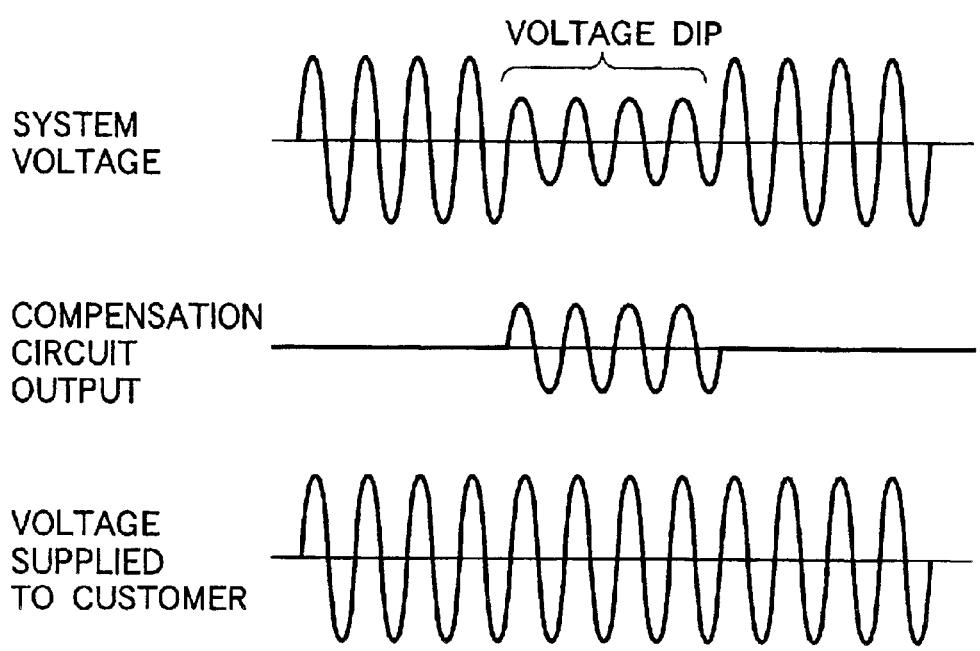
FIG. 19 is a diagram for explaining the voltage compensating operation of the related-art voltage fluctuation compensating apparatus.

As shown in FIG. 17, a voltage Vn0 of a charging capacitor 11n0 dips during the negative voltage compensating operation. On the contrary, a voltage Vp3 of a charging capacitor 11p3 dips during the positive voltage compensating operation while the charging capacitor 11p3 is charged with charges so as to restore its voltage when the voltage compensating circuit P3 is operated during the negative voltage compensating operation. Voltages Vp1 and Vp2 of charging capacitors 11p1 and 11p2 are similar to the voltage Vp3. In such a manner, the voltages of the charging capacitors 11 other than the charging capacitor 11n0 in the voltage compensating circuit N0 have no change in terms of one AC period.

In this embodiment, the compensating voltage output can be controlled with gradations from −7 to 7 by three voltage compensating circuits P1, P2 and P3 for outputting positive voltages and by one voltage compensating circuit N0 for outputting a negative voltage. Thus, voltage compensation with high accuracy can be achieved with a remarkably simplified and low-cost apparatus configuration. Further, the sags of the charging capacitors 11 in the voltage compensating circuits P1, P2 and P3 do not cause distortion in the compensating voltage. The electrostatic capacity values of those capacitors can be selected to be much smaller than that of the charging capacitor 11n in the voltage compensating circuit N0 which has the maximum voltage. Thus, the apparatus as a whole becomes low in cost.

In each of the first to eighth embodiments, the charging capacitors in the voltage compensating circuits respectively have the charging voltages of approximately $2^k$-fold (K=0, 1, 2, . . . ) with respect to the smallest charging voltage value (absolute value) of the charging voltages. However, the ratio of the charging voltages maybe a combination of another voltage charging ratio. The system can be optimized because the combination of the charging voltage ratio of the relationship of the $2^k$-fold does not allow overlap of the charging voltages chargeable to the load.

In each embodiment, the capacitors are used as the energy storage units. However, for example, batteries may be used as the energy storage units in place of the capacitors.

(1) As described above, a voltage fluctuation compensating apparatus according to the invention includes a plurality of voltage compensating circuits connected in series to a power system. The voltage compensating circuits include capacitors respectively having charging voltages different from one another and in relationship of approximately $2^k$-fold (K=0, 1, 2, . . . ) with respect to the smallest charging voltage value (absolute value) of the charging voltages. The voltage compensating circuits convert DC voltages charged in the capacitors into AC voltages and output the AC voltages respectively. The charging voltage values of the capacitors respectively in the voltage compensating circuits are used as bit signals for a reference value so as to check the voltage dip amount of the power system with the reference value and therefore A/D convert the voltage dip amount into a binary signal. A desired combination is selected from the plurality of voltage compensating circuits in accordance with the binary signal so that the total sum of output voltages of the selected voltage compensating circuits compensates for the voltage dip of the power system. Thus, by an apparatus configuration prompted to reduce in cost and size, the compensating voltage can be controlled with gradations at an equal interval so that fine-tuned and high accurate voltage compensation can be carried out.

(2) Moreover, according to the invention, in the voltage fluctuation compensating apparatus as in (1), the charging voltage values of the capacitors respectively used as a reference value for A/D converting the voltage dip amount are detected voltage values obtained by detecting voltages of the respective capacitors at any time. Accordingly, the voltage dip amount can be A/D converted into a binary signal in accordance with the voltage states of the charging capacitors so that accurate compensation can be achieved. As a result, distortion in the compensating voltage can be suppressed so that the electrostatic capacities of the charging capacitors can be reduced.

(3) Moreover, according to the invention, in the voltage fluctuation compensating apparatus as in (1), the charging voltage values of the capacitors respectively used as a reference value for A/D converting the voltage dip amount are calculated voltage values. A system current of the power system is monitored, and the calculated voltage values are calculated at any time by predictive operations of voltage dip amounts of the capacitors on the basis of the current value of the monitored system current. Accordingly, by a low-cost apparatus configuration, the voltage dip amount can be A/D converted into a binary signal in accordance with the voltage states of the charging capacitors so that accurate compensation can be achieved. As a result, distortion in the compensating voltage can be suppressed so that the electrostatic capacities of the charging capacitors can be reduced.

(4) Moreover, according to the invention, in the voltage fluctuation compensating apparatus as in any one of (1) to (3), charging voltages of the respective capacitors in the voltage compensating circuits are set so that an available maximum output voltage of a total compensating circuit constituted by all of the voltage compensating circuits connected in series exceeds a maximum voltage dip amount in the power system. Accordingly, even if a voltage dip occurs in any charging capacitor, the compensating voltage can be secured so that the electrostatic capacities of the charging capacitors can be reduced.

(5) Moreover, according to the invention, in the voltage fluctuation compensating apparatus as in any one of (1) to (4), respective electrostatic capacities of the capacitors in the voltage compensating circuits are set to be substantially equal to or higher than $2^k$-fold (K=0, 1, 2, . . . ) of the smallest electrostatic capacity value of the electrostatic capacities, and to be lowered as charging voltages of the capacitors increase. Accordingly, even if a voltage dip occurs in any charging capacitor, accurate voltage compensation can be achieved.

(6) Moreover, according to the invention, in the voltage fluctuation compensating apparatus as in any one of (1) to (5), when the voltage dip amount is A/D converted into the binary signal, 1 is added to the binary signal so that the smallest charging voltage value of the capacitors is added to the total sum of the output voltages from the voltage compensating circuits determined in accordance with the binary signal, in the case where the total sum of the output voltages is not higher than a voltage value obtained by subtracting a predetermined voltage amount from the voltage dip amount. Accordingly, the voltage supplied to the load can be secured to be not lower than the voltage value obtained by subtracting a predetermined voltage amount from the voltage dip amount. Further, the voltages of the charging capacitors can be set to be high so that the electrostatic capacities thereof can be reduced.

(7) Moreover, according to the invention, in the voltage fluctuation compensating apparatus as in (1), there is provided a sag voltage compensating circuit connected in series to the power system together with the voltage compensating circuits. The sag voltage compensating circuit converts a DC voltage charged in a capacitor into an AC voltage and outputs the AC voltage. When it is detected that voltages of the capacitors respectively in the voltage compensating circuits dip to be not higher than a predetermined value, the sag voltage compensating circuit is operated in accordance with operations of the voltage compensating circuits so that the sum of output voltages of the voltage compensating circuits and an output voltage of the sag voltage compensating circuit compensates for the voltage dip of the power system. Accordingly, even if a voltage dip occurs in any charging capacitor, distortion in the compensating voltage can be suppressed so that the electrostatic capacities of the charging capacitors can be reduced on a large scale.

(8) Moreover, according to the invention, in the voltage fluctuation compensating apparatus as in (1), the voltage compensating circuits selected in accordance with the binary signal can include ones whose output voltages have a polarity reverse to the voltage polarity of the power system. Capacitors respectively in voltage compensating circuits whose output voltages have the same polarity as the power system are discharged in operation, while capacitors respectively in voltage compensating circuits whose output voltages have a reverse polarity to the power system are charged in operation. Accordingly, the charges of the charging capacitors can be utilized effectively so that the period for keeping voltage compensation can be prolonged.

(9) Moreover, according to the invention, in the voltage fluctuation compensating apparatus as in (8), a logical table for converting the binary signal into a binary value in which each bit value is set to 1 when a capacitor is discharged and −1 when a capacitor is charged is created for selecting a combination of the voltage compensating circuits. When a voltage dip is detected in a capacitor in the voltage compensating circuits, a binary value indicating a mode in which the detected capacitor can be charged is chosen from the logical table in accordance with the detected state so that each capacitor in the voltage compensating circuits selected in accordance with respective bit values of the binary value is charged when the bit value corresponding to the capacitor is 1 and discharged when the bit value corresponding to the capacitor is −1. Accordingly, accurate voltage compensation can be always carried out. In addition, the charges of the charging capacitors can be utilized effectively so that the voltage compensation can be carried out surely continuously over a long time. Further, as a result, the electrostatic capacities of the charging capacitors can be reduced.

(10) According to the invention, in the voltage fluctuation compensating apparatus as in (8), an output voltage of one of the voltage compensating circuits has a first polarity while output voltages of the other voltage compensating circuits have a second polarity reverse to the first polarity. The absolute value of a charging voltage of a capacitor in the first-polarity voltage compensating circuit is substantially equal to the absolute value of the total sum of charging voltages of capacitors in the other second-polarity voltage compensating circuits. A desired combination of the second-polarity voltage compensating circuits and the first-polarity voltage compensating circuit are selectively operated when the voltage of the power system has the first polarity. On the other hand, a combination of only the second-polarity voltage compensating circuits is selectively operated when the voltage of the power system has the second polarity. Accordingly, high accurate voltage compensation can be achieved with a remarkably simplified and low-cost apparatus configuration. In addition, the electrostatic capacities of the charging capacitors in the second-polarity voltage compensating circuits can be reduced.

What is claimed is:

1. A voltage fluctuation compensating apparatus for suppressing fluctuation of a voltage supplied to a load, comprising:

a detection/control portion for detecting a voltage dip in a power system, and controlling power feeding in accordance with detection of a voltage dip; and a plurality of voltage compensating circuits connected to the power system in series, each of the voltage compensating circuits including a plurality of energy storage units respectively having charging voltages different from one another, the voltage compensating circuits converting DC voltages of the respective energy storage units into AC voltages and outputting the AC voltages, wherein the charging voltages of the energy storage units in the voltage compensating circuits are used as bit signals for a reference value to check a voltage dip amount of the power system with the reference value and to convert the voltage dip amount into a binary signal, and a combination of the voltage compensating circuits is selected from the plurality of voltage compensating circuits in accordance with the binary signal so that a sum of output voltages of the voltage compensating circuits selected compensates for the voltage dip of the power system.

2. The voltage fluctuation compensating apparatus according to claim 1, wherein the energy storage units in the voltage compensating circuits respectively have charging voltages of approximately $2^k$ (where K=0, 1, 2, ...) times a smallest charging voltage of the charging voltages.

3. The voltage fluctuation compensating apparatus according to claim 1, wherein respective the energy storage units are a plurality of capacitors.

4. The voltage fluctuation compensating apparatus according to claim 3, wherein the charging voltages of the capacitors used as a reference value for converting the voltage dip amount into a binary signal are detected voltages obtained by detecting voltages of the respective capacitors at any time.

5. The voltage fluctuation compensating apparatus according to claim 3, wherein a system current of the power system is monitored; and the charging voltages of the capacitors used as a reference value for converting the voltage dip amount into a binary signal are voltages calculated at any time by predicting voltage dip amounts of the capacitors based on the system current monitored.

6. The voltage fluctuation compensating apparatus according to claim 3, wherein charging voltages of the respective capacitors in the voltage compensating circuits are set so that an available maximum output voltage of a total compensating circuit constituted by all of the voltage compensating circuits connected in series exceeds a maximum voltage dip amount in the power system.

7. The voltage fluctuation compensating apparatus according to claim 3, wherein respective capacitances of the capacitors in the voltage compensating circuits become lower as the charging voltages of the capacitors increase.

8. The voltage fluctuation compensating apparatus according to claim 7, wherein respective capacitances of the capacitors in the voltage compensating circuits are, at least, approximately equal $2^k$ (where K=0, 1, 2, . . . ) times the smallest of the capacitances.

9. The voltage fluctuation compensating apparatus according to claim 3, wherein, when the voltage dip amount is converted into the binary signal, 1 is added to the binary signal so that a smallest charging voltage of the capacitors is added to a total sum of the output voltages from the voltage compensating circuits determined in accordance with the binary signal, if the sum of the output voltages is not higher than a voltage value obtained by subtracting a predetermined voltage amount from the voltage dip amount.

10. The voltage fluctuation compensating apparatus according to claim 7, further comprising a sag voltage compensating circuit connected to the power system in series, together with the voltage compensating circuits, the sag voltage compensating circuit converting a DC voltage of a capacitor into an AC voltage and outputting the AC voltage, wherein, when it is detected that voltages of the respective capacitors in the voltage compensating circuits dip and are not higher than a predetermined value, the sag voltage compensating circuit is operated in accordance with operations of the voltage compensating circuits so that a sum of output voltages of the voltage compensating circuits and an output voltage of the sag voltage compensating circuit compensates for the voltage dip of the power system.

11. The voltage fluctuation compensating apparatus according to claim 3, wherein the voltage compensating circuits selected in accordance with the binary signal include voltage compensation circuits having output voltages with a polarity reverse to voltage polarity of the power system; and the respective capacitors in the voltage compensating circuits having output voltages with the same polarity as the power system are discharged, in operation, while the respective capacitors in the voltage compensating circuits having output voltages in reverse polarity to the power system are charged, in operation.

12. The voltage fluctuation compensating apparatus according to claim 11, wherein a logic table is created for selecting a combination of the voltage compensating circuits;

the logic table converts the binary signal into a binary value in which each bit value is set to 1 when a capacitor is discharged and −1 when a capacitor is charged; and when a voltage dip is detected in one of the capacitors in the voltage compensating circuits, a binary value indicating a mode in which the detected capacitor can be charged is chosen from the logic table in accordance with the detected state so that each capacitor in the voltage compensating circuits selected in accordance with respective bit values of the binary value is charged when the bit value corresponding to the capacitor is 1 and discharged when the bit value corresponding to the capacitor is 4.

13. The voltage fluctuation-compensating apparatus according to claim 11, wherein an output voltage of one of the voltage compensating circuits has a first polarity while output voltages of other voltage compensating circuits have a second polarity reverse to the first polarity;

absolute value of a charging voltage of the capacitor having the first polarity is approximately equal to an absolute value of a sum of charging voltages of the capacitors having the second-polarity;

a combination of the voltage compensation circuits having the second-polarity and the voltage compensation circuits having the first-polarity are selectively operated when the voltage of the power system has the first polarity; and a combination of only the voltage compensation circuits having the second-polarity voltage compensating circuits is selectively operated when the voltage of the power system has the second polarity.

* * * * *